US010085074B2

(12) United States Patent
Hood et al.

(10) Patent No.: US 10,085,074 B2
(45) Date of Patent: Sep. 25, 2018

(54) SYSTEMS AND METHODS FOR PLANNING, EXECUTING, AND REPORTING A STRATEGIC ADVERTISING CAMPAIGN FOR TELEVISION

(71) Applicant: ADOBE SYSTEMS INCORPORATED, San Jose, CA (US)

(72) Inventors: Alexander R. Hood, Oakland, CA (US); Jason Lopatecki, San Francisco, CA (US); Justin K. Sung, Berkeley, CA (US); Greg Collison, Oakland, CA (US); David Innes-Gawn, Atwater, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 15/297,841

(22) Filed: Oct. 19, 2016

(65) Prior Publication Data
US 2017/0055043 A1 Feb. 23, 2017

Related U.S. Application Data

(63) Continuation of application No. 14/716,737, filed on May 19, 2015, now Pat. No. 9,501,783.
(Continued)

(51) Int. Cl.
*H04H 60/33* (2008.01)
*H04N 21/81* (2011.01)
(Continued)

(52) U.S. Cl.
CPC ....... *H04N 21/812* (2013.01); *G06Q 30/0243* (2013.01); *G06Q 30/0244* (2013.01);
(Continued)

(58) Field of Classification Search
CPC ........... H04N 21/2407; H04N 21/2547; H04N 21/258
See application file for complete search history.

(56) References Cited

U.S. PATENT DOCUMENTS 5,600,364 A * 2/1997 Hendricks .............. H04H 20/10
348/E5.002
6,286,005 B1 * 9/2001 Cannon .................. G06Q 30/02
455/2.01
(Continued)

FOREIGN PATENT DOCUMENTS

WO WO-01/07985 2/2001
WO WO-2009/012235 1/2009
(Continued)

OTHER PUBLICATIONS

"Notice of Allowance dated Jul. 19, 2016; U.S. Appl. No. 14/716,737", (dated Jul. 19, 2016).
(Continued)

*Primary Examiner* — Pankaj Kumar
*Assistant Examiner* — Timothy R Newlin
(74) *Attorney, Agent, or Firm* — Keller Jolley Preece

(57) ABSTRACT

Systems and methods are disclosed for planning, executing, reviewing, and reporting the results of an advertising campaign to be run on TV. A demand-side platform receives ad slot opportunities from TV programming sources, and analyzes the ad slots to produce a prioritized list of placement opportunities for the advertising campaign to be presented to advertiser/clients. Each ad slot is analyzed with respect to past viewership data and with respect to desired targeting characteristics that may include conventional age and gender targeting, or additionally strategic targeting characteristics. Scores are established for each ad slot with respect to numbers of projected on-target impressions and/or a cost for projected on-target impressions. The scores are sorted to
(Continued)

produce the prioritized list. Projected results can be viewed with respect to any or all of network, day, and daypart. After a campaign has completed, viewership data representing actual results is acquired, processed, and reported.

27 Claims, 19 Drawing Sheets

Related U.S. Application Data

(60) Provisional application No. 62/069,204, filed on Oct. 27, 2014.

(51) Int. Cl.
*G06Q 30/02* (2012.01)
*H04N 21/442* (2011.01)
*H04N 21/2547* (2011.01)
*H04N 21/258* (2011.01)
*H04N 21/2668* (2011.01)

(52) U.S. Cl.
CPC ..... *G06Q 30/0247* (2013.01); *G06Q 30/0251* (2013.01); *G06Q 30/0273* (2013.01); *G06Q 30/0276* (2013.01); *H04N 21/2547* (2013.01); *H04N 21/25883* (2013.01); *H04N 21/25891* (2013.01); *H04N 21/2668* (2013.01); *H04N 21/44204* (2013.01); *H04N 21/44213* (2013.01)

(56) References Cited

U.S. PATENT DOCUMENTS

| | | | |
|---|---|---|---|
| 8,112,301 B2 | 2/2012 | Harvey et al. | |
| 8,627,359 B2 | 1/2014 | Kitts et al. | |
| 8,768,766 B2 | 7/2014 | Ellis et al. | |
| 8,874,652 B1 | 10/2014 | Pecjak et al. | |
| 9,501,783 B2* | 11/2016 | Hood | G06Q 30/0247 |
| 2005/0246736 A1* | 11/2005 | Beyda | G06Q 30/0273 |
| | | | 725/35 |
| 2006/0212350 A1 | 9/2006 | Ellis et al. | |
| 2007/0073583 A1 | 3/2007 | Grouf et al. | |
| 2007/0157228 A1* | 7/2007 | Bayer | G06Q 30/02 |
| | | | 725/34 |
| 2007/0220575 A1* | 9/2007 | Cooper | H04N 7/1675 |
| | | | 725/118 |
| 2007/0250901 A1* | 10/2007 | McIntire | H04N 7/17318 |
| | | | 725/146 |
| 2007/0261072 A1* | 11/2007 | Boulet | G06Q 30/02 |
| | | | 725/14 |
| 2007/0288953 A1* | 12/2007 | Sheeman | G06Q 30/08 |
| | | | 725/34 |
| 2008/0022301 A1* | 1/2008 | Aloizos | G06Q 30/02 |
| | | | 725/34 |
| 2008/0040739 A1* | 2/2008 | Ketchum | G06Q 30/02 |
| | | | 725/32 |
| 2008/0072251 A1* | 3/2008 | Namvar | G06Q 30/02 |
| | | | 725/36 |
| 2008/0250447 A1* | 10/2008 | Rowe | G06Q 30/02 |
| | | | 725/32 |
| 2008/0271070 A1* | 10/2008 | Kanojia | G06Q 30/0251 |
| | | | 725/32 |
| 2009/0006145 A1 | 1/2009 | Duggal et al. | |
| 2009/0077579 A1* | 3/2009 | Li | G06Q 30/02 |
| | | | 725/34 |
| 2009/0150405 A1 | 6/2009 | Grouf et al. | |
| 2009/0177542 A1 | 7/2009 | Haberman et al. | |
| 2009/0197582 A1 | 8/2009 | Lewis et al. | |
| 2009/0248478 A1 | 10/2009 | Duggal et al. | |
| 2009/0292587 A1 | 11/2009 | Fitzgerald | |
| 2010/0313218 A1* | 12/2010 | Niemeijer | H04N 21/812 |
| | | | 725/35 |
| 2011/0107259 A1 | 5/2011 | Haugh et al. | |
| 2011/0225608 A1 | 9/2011 | Lopatecki et al. | |
| 2011/0288907 A1 | 11/2011 | Harvey et al. | |
| 2012/0042338 A1 | 2/2012 | Kitts et al. | |
| 2012/0084813 A1 | 4/2012 | Dmitriev et al. | |
| 2012/0167125 A1* | 6/2012 | Grubb | H04N 21/252 |
| | | | 725/14 |
| 2012/0215622 A1 | 8/2012 | Ramer et al. | |
| 2013/0218640 A1 | 8/2013 | Kidder et al. | |
| 2014/0195334 A1 | 7/2014 | Emans et al. | |
| 2014/0196081 A1* | 7/2014 | Emans | G06Q 30/0273 |
| | | | 725/32 |
| 2014/0278912 A1 | 9/2014 | Hughes et al. | |
| 2014/0325551 A1 | 10/2014 | McMillan | |
| 2016/0100788 A1 | 4/2016 | Sano et al. | |
| 2016/0117719 A1 | 4/2016 | Hood et al. | |
| 2016/0117720 A1 | 4/2016 | Hood et al. | |
| 2016/0119689 A1 | 4/2016 | Hood et al. | |

FOREIGN PATENT DOCUMENTS

| | | |
|---|---|---|
| WO | WO-2009/050546 | 4/2009 |
| WO | WO-2014/066619 | 5/2014 |

OTHER PUBLICATIONS

"Office Action dated Apr. 6, 2016; U.S. Appl. No. 14/716,737", (dated Apr. 6, 2016).
U.S. Appl. No. 14/923,153, Nov. 2, 2016, Office Action.
U.S. Appl. No. 14/923,153, Jul. 13, 2017, Office Action.
U.S. Appl. No. 14/716,774, May 5, 2017, Office Action.
U.S. Appl. No. 14/823,153, Jan. 2, 2018, Office Action.
U.S. Appl. No. 14/716,774, Dec. 18, 2017, Office Action.
U.S. Appl. No. 14/923,183, Mar. 5, 2018, Office Action.

* cited by examiner

TV Reporting Download – Raw Data

| Ad ID | Date | Day of Week | Time | Daypart | Network | HH Impressions | Demo Impressions | Strategic Target Impressions | Demo + Strategic Impressions | Cost |
|---|---|---|---|---|---|---|---|---|---|---|
| 1002 | 1004 | 1006 | 1008 | 1010 | 1012 | 1014 | 1016 | 1018 | 1020 | 1022 |

Fig. 10

| | Morning (6-10) | Daytime (10-4) | Early Fringe (4-7pm) | Primetime (7-11pm) | Overnight (11pm-6am) |
|---|---|---|---|---|---|
| Monday | x | | | | |
| Tuesday | x | | x | | |
| Wednesday | x | | x | | |
| Thursday | x | | x | x | |
| Friday | x | | x | | |
| Saturday | x | x | x | x | x |
| Sunday | x | x | x | x | x |

Other "Strategic" Targeting Information

Purchase/Usage Data — 1902

- Nielsen PRIZM Code
- Nielsen P$YCLE Z6 Code
- Nielsen ConneXions Z6 Code
- Principal Shopper
- Frequent Moviegoer Code
- Avid Moviegoer Code
- Principal Moviegoer Code
- Pay Channels
- Beverage Usage Bottled Water
- Beverage Usage Coffee or Tea
- Beverage Usage Soft Drinks
- Beverage Usage Table Wine

Ownership Data — 1904

- DVD Owner
- Presence of DVR
- Number of TV Sets
- Number of TV Sets with Pay
- Video Game Owner
- Number of VCRs
- Number of Cars
- Number of Trucks
- New Car Prospect Last 3 Years
- New Car Prospect Last 5 Years
- New Truck Prospect Last 3 Years
- New Truck Prospect Last 5 Years
- College Student Away
- HD Capable Home
- Number of Operable Computers Code
- Number of Operable Tablets Code
- Cell Phone used to Access

Fig. 19

SYSTEMS AND METHODS FOR PLANNING, EXECUTING, AND REPORTING A STRATEGIC ADVERTISING CAMPAIGN FOR TELEVISION

CROSS-REFERENCE TO RELATED APPLICATIONS

This application is a continuation of U.S. patent application Ser. No. 14/716,737 filed May 19, 2015, which claims the benefit of U.S. Provisional Patent Application No. 62/069,204 filed Oct. 27, 2014.

BACKGROUND OF THE INVENTION

1. Field of the Invention

The present invention relates generally to systems and methods for planning and managing advertising campaigns that run on television.

2. Prior Art

In the RTB (Real-Time Bidding) environment for media impression auctions and purchases, an electronic advertising agency/consolidator operating a demand-side platform traditionally receives billions of daily auction opportunities for electronic media impressions from partners like Google®, Yahoo®, etc., and bids for the impression opportunities on behalf of client/advertisers. Recently, there has arisen is a need for demand-side platforms to offer planning and execution for cross-platform campaigns (supporting traditional TV and digital media), as well as advertising campaigns that support purely traditional TV ad impressions. When targeting these purely TV opportunities, the demand-side platform can offer improved targeting and efficiencies as a result of their skill set in developing planning and analysis tools for digital media campaigns. Typically, a conventional TV ad campaign is based primarily on targeting basic demographic information—age and gender. There are, however, opportunities to use more advanced and strategic targeting characteristics beyond age and gender as will be described herein, and to offer planning tools including user interfaces that provide a planner of TV advertising campaigns with improved visibility and targeting efficiencies—producing more effective and cost efficient campaigns. A "user" as described herein is a person operating a user interface according to the invention for the purpose of planning, analyzing, or reporting on a future or past ad campaign.

Note that in some scenarios, the advertising agency/consolidator operating a demand-side platform and the advertiser/client may in fact be the same entity—for instance when they comprise a large organization with an internal advertising department capable of acting as a demand-side platform. A "user" or "planner" may be associated with any or all of these organizations. Also, in such an instance, there may be no internal auction—just a submission to an external auction and/or supplier. Also, the direct customer of a demand-side platform may not be the client/advertiser themselves, but may be a broker service of some kind that in turn services client/advertisers.

As used in describing invention as defined herein, traditional television or TV includes:

Connected TV;
VOD (Video on Demand);
Traditional Broadcast TV;
Cable TV; and
TV programming provided online.

TV as described herein is differentiated from viewer-targeted online video advertising with respect to how ads are targeted/chosen. For viewer-targeted online advertising the demand-side platform typically knows the demographics of the viewer based on their cookie before bidding, and/or they know a demographic profile for the website where the ad is to be shown. For the more "traditional" TV, which for this specification is referred to as "TV", it is not known in advance of showing advertisements who will watch, and ads are therefore more associated with the TV programming itself. For instance to target car lovers, advertisers and demand-side platforms representing them would choose to advertise in ad slots within car-focused TV programs.

TV programming as defined herein may be therefore viewed on conventional TV sets, or on any digital media viewing device, including without limitation PC/laptops, tablets, smartphones, and even digital watches. Traditional Television may be linear (available at a particular time of day) or Video on Demand (VOD) where a program is made available to a viewer on demand. Traditional TV typically—but not always—has ad slots associated with it. When ad slots are associated, all viewers of a program will see the same advertisements. For TV programming shown nationally but with regionally or channel focused advertisements, all viewers within a region or channel will see the same advertisements. As such, demographic data on what categories of viewers viewed what advertisements needs to be obtained from $3^{rd}$ party monitoring organizations after the fact.

VOD is further defined as systems that allow users to select and watch/listen to video or audio content when they choose to, rather than having to watch at a specific broadcast time. IPTV technology is often used to bring video on demand to televisions and personal computers. Television VOD systems can either stream content through a set-top box, a computer or other device, allowing viewing in real time, or download it to a device such as a computer, digital video recorder (also called a personal video recorder) or portable media player for viewing at any time.

Other Definitions

Ad Placement—an ad placement is a combination of an Ad and a budget, flight dates, and targeting for the ad.

Ad Campaign—an ad campaign is a group of placements.

Viewership Data—Viewership data describes who watched (or is projected to watch) an ad, and what their viewer characteristics are.

Placement Data—This includes data like numbers of impressions and times when impressions occurred. If also includes networks where impressions occurred and actual costs of impressions.

Placement Parameters—These are parameters supplied by a user/planner at a client advertiser or demand-side platform that control the operation of the ad campaign. These include for instance: budget; dates; maximum cost per impression; minimum goal for total impressions; types of TV programming to be targeted; and daypart segments to be targeted.

Viewer—A viewer may be either a person, cookie, household, or any group of persons that watch the same programming—regardless of whether or not they watch simultaneously.

Videos—A repository of all creative assets that have been loaded on a demand-side platform and are available for use in an ad campaign.

Ad Types—List of all possible ad types supported by the demand-side platform. These may include for example Linear, VOD, or Addressable. Linear is traditional continuous TV where programming is set for any particular time of day.

Video on Demand streams a video program at a viewer's request at a requested time of day. Addressable means that the MVPD (Multichannel Video Programming Distributor) can send different ads to each household.

The invention is a computerized process wherein one or more processors operate the invention with user guidance/input. The one or more processors may be implemented as one or more servers that may be co-located, or alternately located at remote locations, or located in the Cloud. The "Cloud" typically refers to computers/processors located at remote locations where their use is typically provided as a service—also known as Infrastructure as a Service.

BRIEF DESCRIPTION OF THE DRAWINGS

FIG. 10 shows an exemplary report listing data available for download after a campaign has run.

FIG. 12 shows a graphical mechanism for inputting specific dayparts for each day of the week where a campaign should place advertisements.

FIG. 14 describes a user interface and underlying processes according to the invention for displaying real or projected results for a TV advertising campaign for either planning or review purposes. Here, impressions and CPMs are displayed graphically with respect to networks and daypart, and intensity bar graphs are shown to indicate amounts of impressions with respect to both networks and daypart. Demographic and Strategic parameters for the campaign are also set in this user interface.

FIG. 19 presents an exemplary list of other "strategic" targeting viewership data available from $3^{rd}$ Party Sources.

DETAILED DESCRIPTION OF THE PREFERRED EMBODIMENTS

Figure 1:
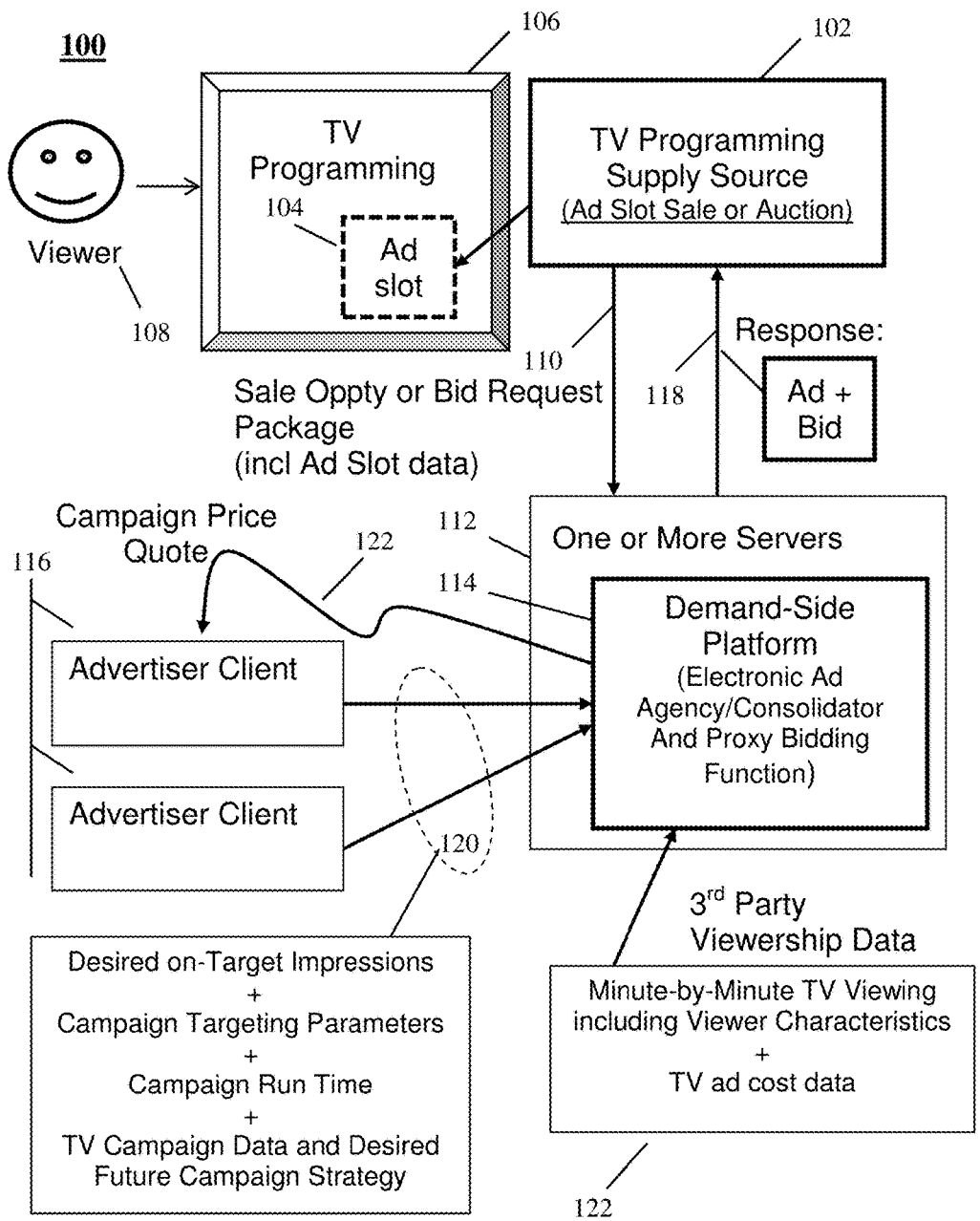
FIG. 1 is an overview data flow diagram according to the invention indicating how one or more servers receive and transmit data to a TV programming supply source as well as communicating with advertiser/clients and third-party viewership data.

Systems and methods are disclosed for planning, executing, reviewing, and reporting the results of an advertising campaign to be run on TV. A demand-side platform receives ad slot opportunities from TV programming sources, and analyzes the ad slots to produce a prioritized list of placement opportunities for the advertising campaign to be presented to advertiser/clients. Each ad slot is analyzed with respect to past viewership data and with respect to desired targeting characteristics that may include conventional age and gender targeting, or additionally strategic targeting characteristics. Scores are established for each ad slot with respect to numbers of projected on-target impressions and/or a cost for projected on-target impressions. The scores are sorted to produce the prioritized list. Projected results can be viewed with respect to any or all of network, day, and daypart. After a campaign has completed, viewership data representing actual results is acquired, processed, and reported.

Optimization for a campaign targeting traditional TV according to the invention can be performed for cost and/or for reach, including optimization for CPMs (Cost per 1,000 impressions) and/or GRPs (Gross Rating Points). Optimization can be performed while structuring the recommended TV order to balance trade-offs between efficiency of reaching target audiences and diversification across inventory.

Note that 3rd party viewership data suppliers may supply data indicative of a viewer panel and/or actual viewership data acquired by monitoring a large number of viewers over time. The most prominent supplier of viewership data today is Nielsen, however other sources of viewership data exist, and without limitation may include for example Barb in the UK, OZTam in Australia, and Rentrak in the US. The embodiments described herein do not rely on any specific supplier of viewership data, and any specific mentions of data packages supplied by, for example Nielsen, are only exemplary. Also note that while viewership data as referred to herein for most exemplary embodiments typically refers to historical viewing, the invention is not limited solely to historical viewership data. Embodiments described herein may also utilize projected future viewership data if and when such data is available and a client/advertiser wishes to see projected campaign results based on such data.

One object of the invention is to offer to planners operating on behalf of client/advertisers a self-serve programmatic tool for planning TV advertising campaigns, and for reviewing the results of those campaigns after they have run.

Another object of the invention is to more easily and effectively reach strategic targets, beyond the basic demographic "age and gender" targeting typically utilized by planners. Strategic viewer characteristics are defined herein as those not including age and gender. Strategic targeting can include without limitation and for example any or all of . . .

buying behavior;
income
ethnicity;
education;
children;
home;
auto; and
pets

. . . to name only a few. Note that buying behavior characteristics can be very specific and complex. For instance, a strategic campaign can target viewers who viewed and/or purchased a specific category of product or brand of product within a specific time period.

The tools described herein typically are used interactively where a planner typically guides a planning or reviewing tool by choosing scenarios. The tool then automatically accesses any appropriate data sources and/or databases, and then automatically computes information of interest to display for the planner.

FIG. 1 shows an overview block diagram 100 for a system according to the invention where a demand-side platform 114 interacts client/advertisers 116; sources of TV programming 102; and sources 122 of third party viewership data. A demand-side platform 114 utilizes automation software operating on one or more servers/processors 112 to bid for ad slots 104 to be shown to viewers 108 via TV programming 106. A TV programming supply source 102 typically provides a sale opportunity or bid request package 110—typically including ad slot data—to the demand-side platform 114. The demand-side platform will, in turn and if appropriate, provide a response 118 to the TV programming supply source 102, that response including a bid and either an advertisement or information describing an advertisement. The decision to bid, and how much to bid, is either automatically or semi-automatically calculated by software running on the one or more servers 112 where information 120 supplied by client/advertiser 116 is processed. Such information may include for example and without limitation: desired on-target impressions; campaign targeting parameters; campaign runtime; and TV campaign data and desired campaign strategy.

Figure 2:
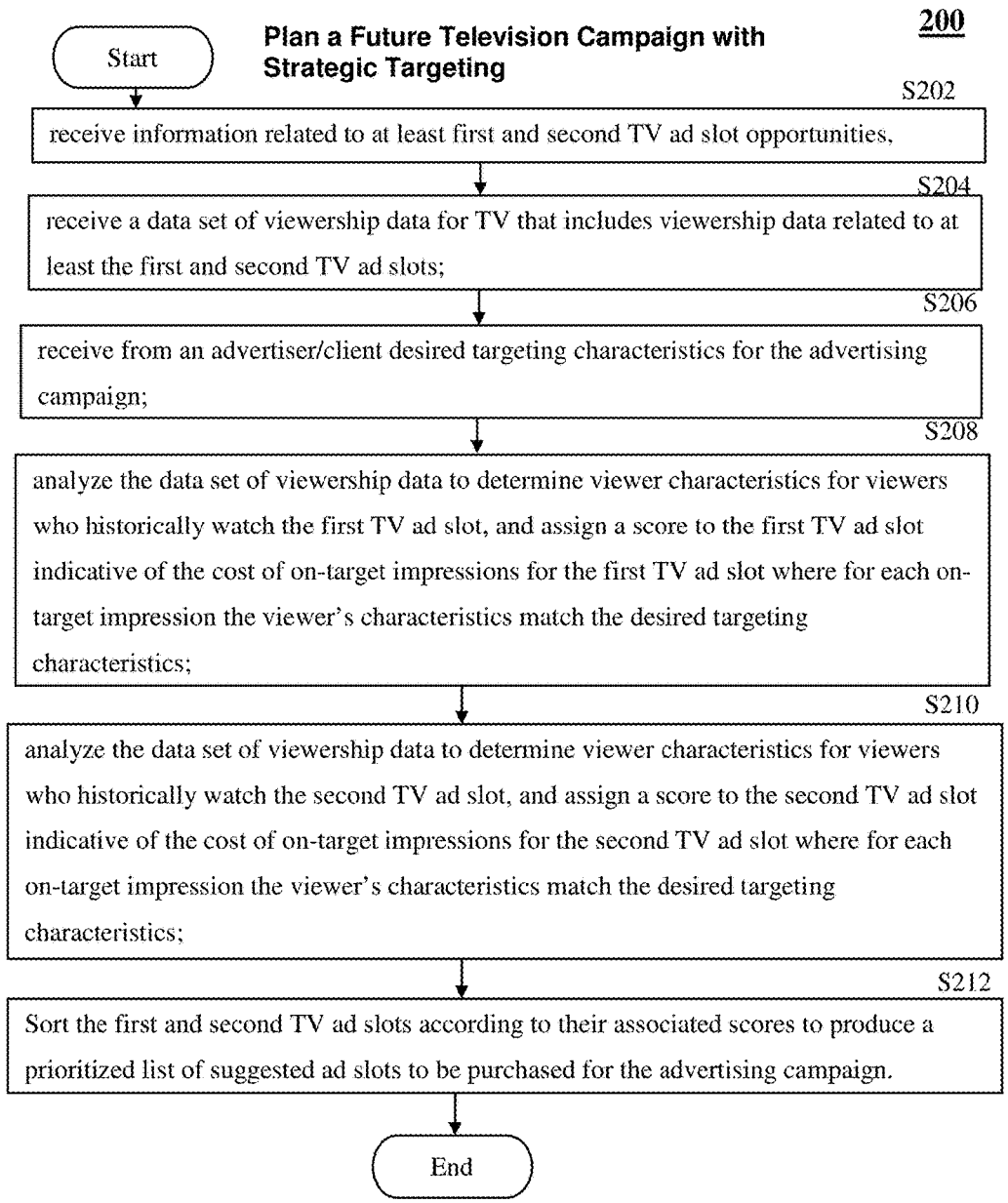
FIG. 2 is an exemplary and non-limiting flowchart according to the invention for planning a future television campaign including strategic targeting.

FIG. 2 shows an exemplary and non-limiting flow chart 200 describing a process for planning a strategic advertising campaign for Television. Note that prioritizing a recommended TV placement order (the list of suggested ad slots) can be done to balance trade-offs between efficiency of a reaching target audience and diversification across inventory. In order to facilitate this, a cumulative maximum may be established for spending limits where each suggested ad slot may be assigned a maximum spending limit, such that a diversity of placements is optionally implemented over some pre-determined number of ad slots.

In step S202 of FIG. 2, a demand-side platform receives information related to at least first and second TV ad slot opportunities. Such information may include for example and without limitation: network, day of week, daypart, available impressions, spot rate and CPM. In step S204 the demand-side platform receives a data set of viewership data for television that includes viewership data related to at least the first and second TV ad slots. In step S206 the demand-side platform receives from an advertiser/client desired targeting characteristics for an advertising campaign. In step S208, the data set of viewership data is automatically analyzed to determine viewer characteristics for viewers who historically watched the first TV ad slot, and a score is assigned to the first TV ad slot indicative of the cost of on-target impressions for the first TV ad slot, where for each on-target impression the viewer's characteristics match the desired targeting characteristics. In step S210, the data set of viewership data is analyzed to determine viewer characteristics for viewers who historically watched the second TV ad slot, and a score is assigned to the second TV ad slot indicative of the cost of on-target impressions for the second TV ad slot, where for each on-target impression the viewer's characteristics match the desired targeting characteristics. In step S212, the first and second TV ad slots are sorted according to their associated scores to produce a prioritized list of suggested ad slots to be purchased or bid on for the advertising campaign.

Figure 3:
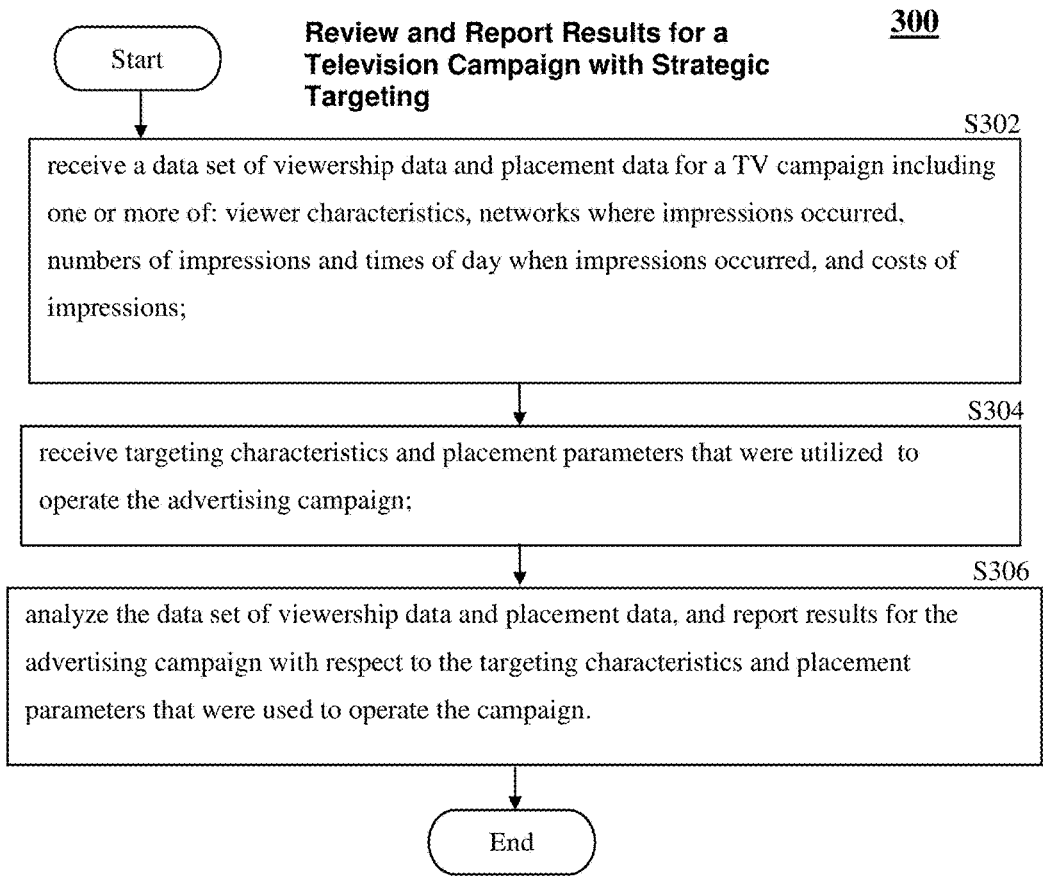
FIG. 3 is an exemplary and non-limiting flowchart according to the invention for reviewing and reporting results for a television campaign including strategic targeting.

FIG. 3 shows an exemplary and non-limiting flow chart 300 describing a process for reviewing and reporting results for a strategic advertising campaign for Television.

Note that for the exemplary user interface compositions and functionalities shown in FIGS. 4-18, in most cases functionalities according to the invention that are used in the planning stage of a campaign for dealing with projected results can also be used after a campaign has run to review the actual results of the campaign.

In step S302 a data set of viewership data and placement data for a TV ad campaign is received by a demand-side platform that includes one or more of: viewer characteristics, networks where impressions occurred, numbers of impressions and times of day when impressions occurred, and costs of impressions. Then in step S304 targeting characteristics and placement parameters that were utilized to operate the advertising campaign are received. Last in step S306, the data set of viewership data and placement data are automatically analyzed, and results are reported for the advertising campaign with respect to the targeting characteristics and placement parameters that were used to operate the campaign.

Regarding reporting results for the advertising campaign with respect to the targeting characteristics and placement parameters that were used to operate the campaign, a few examples of such functionality follow. For instance, if specific dayparts were targeted for a campaign, then a results report could include actual on-target impressions or CPMs with respect to daypart. If both strategic viewer characteristics and demographic viewer characteristics are targeted, a results report could include impressions or CPMs per time with respect to demographic targeting, strategic targeting, and any combination thereof. If specific networks were targeted for a campaign in addition to targeting specific dayparts, then a results report could include a graph showing numbers of on target impressions for each network with respect to daypart.

The following FIGS. 4 through 17 show exemplary computerized user interface facilities for operating the invention. For each exemplary user interface a user, who may be a campaign planner or any person at a client/advertiser organization or demand-side platform, operates the user interface by entering parameter choices and parameter data, and also by choosing desired display configurations depending on which parameters/data they wish to enter or choose at a particular point in time, and/or which projected or actual results information they wish to view. Typically, when a user enters new information, software operating on one or more processors will cause other data/parameters displayed in the user interface to change.

Figure 4:
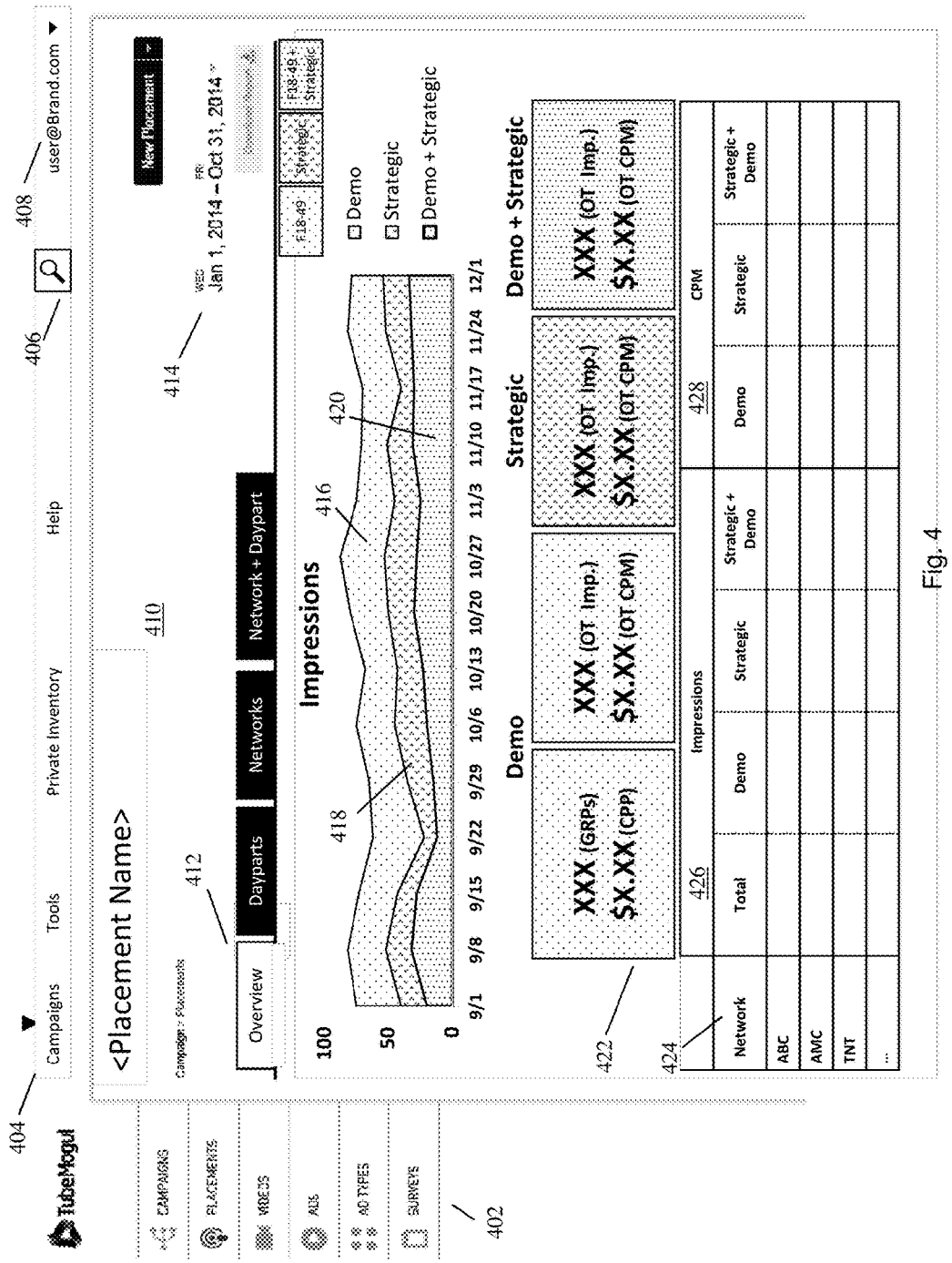
FIG. 4 describes a user interface and underlying processes according to the invention for displaying real or projected results for a TV advertising campaign including demographic, strategic, and combined targeting.

FIG. 4 shows an overview tab for an exemplary user interface for a planning tool according to the invention. Here, projected results are summarized in total and with respect to TV network for impressions resulting from basic demographic targeting (age and gender), strategic targeting, and a combination of basic demographic and strategic targeting. Projected results may be shown in terms of GRPs (Gross Rating Points); CPPs (cost per GRP); on-target impressions, and cost per 1,000 on-target impressions.

Per the exemplary user interface shown in FIG. 4, menu choices 402 are shown at the left of the display and includes the ability to view TV ad campaigns according to any of: campaigns; placement; videos; ads; ad types; and surveys. For any of menu choices 402, the user interface also displays views according to menu 404 shown at the top of FIG. 4, which includes doe example: campaigns; tools; private inventory; and help. A search capability 406 may be included as well as an indication of a specific user 408 operating the user interface, as well as a date range 414 for the campaign. The primary area 410 of the user interface contains primary tabs 412 which include: overview; dayparts; networks; and network+daypart, where for FIG. 4 the tab entitled overview has been selected. In the center of primary area 410 is a graph of impressions over time where the graph is layered to provide independent indications of impressions due to demographic (demo) targeting 416, strategic targeting 418 and demographic+strategic targeting 420, while simultaneously showing cumulative impressions by stacking the categories in a layered fashion. Below this graph are summary boxes 422 showing data for demo, strategic, and demo+strategic targeting. Data for demo targeting is shown in terms of GRPs in one box and on-target impressions in another box, with associated costs for each. Data for strategic and demo+strategic targeting are shown in their respective boxes in terms of on-target impressions and cost in terms of CPM (Cost per 1,000 impressions). Last, at the bottom of the primary display area 410 of FIG. 4 is a summary table where impressions 426 are summarized by network 424. CPM 428 are also summarized by network. As a campaign planner/user operates the user interface and alters campaign parameters according to user interface functionalities such as for example and without limitation those shown in FIGS. 11 through 14, user interface displays such as that shown in FIG. 4 and other Figures herein will report projected results in advance of the campaign, or actual results after a campaign runtime has been completed.

Figure 5:
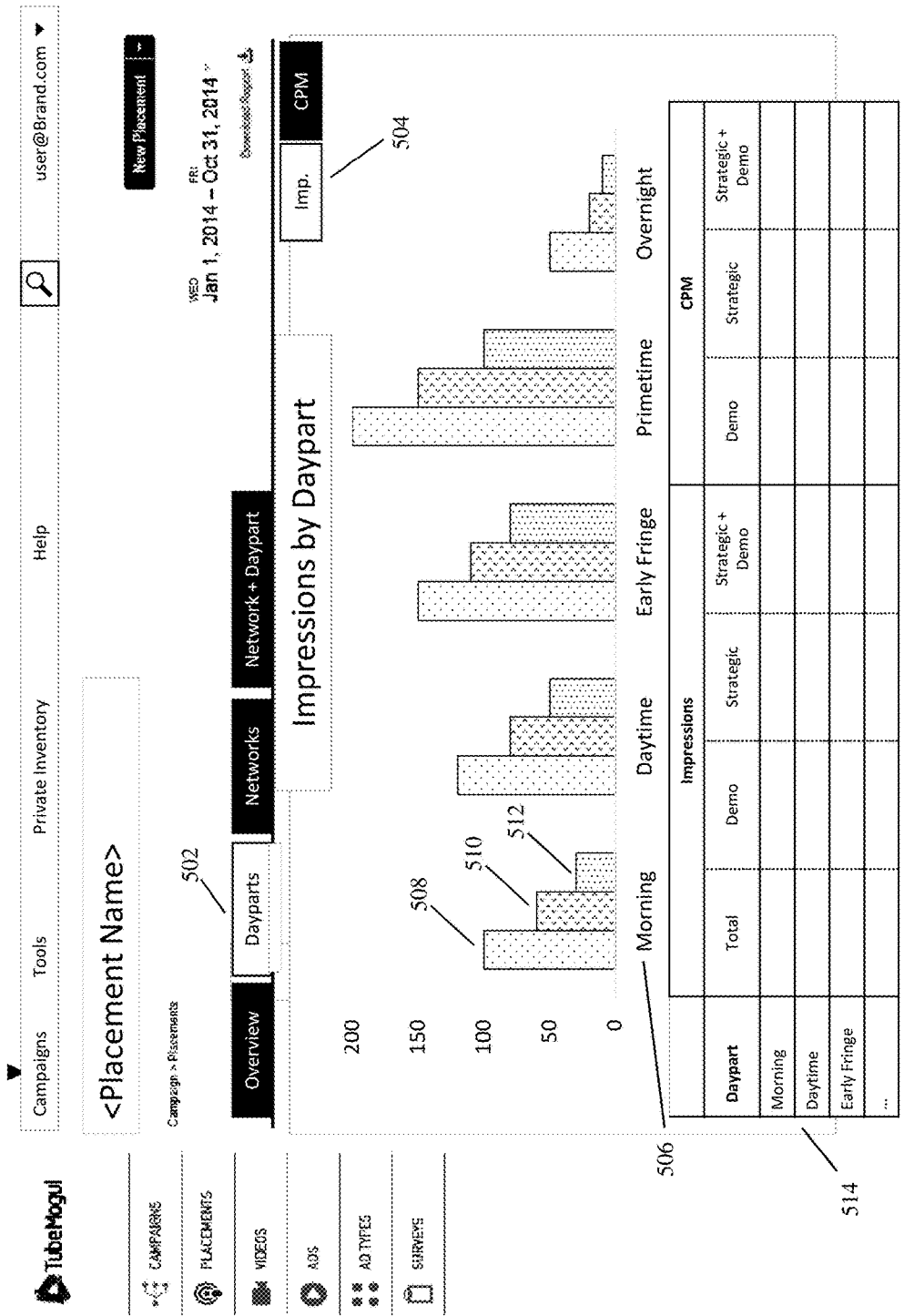
FIG. 5 describes a user interface and underlying processes according to the invention for displaying real or projected results for a TV advertising campaign with specific emphasis on projected or reported results displaying impressions according to daypart.

FIG. 5 shows a "dayparts" tab 502 for an exemplary user interface for a tool according to the invention. Here, projected or actual results for impressions are summarized by time of day and shown for basic demographic targeting (age and gender), strategic targeting, and a combination of basic demographic and strategic targeting. The user interface displayed in FIG. 5 results from the dayparts tab 502 being selected in order to view campaign results—projected or actual—according to dayparts. FIG. 5 can be controlled to display a graph of daypart results according to either impressions or CPM, and in the example of FIG. 5 viewing results by impressions 504 has been chosen. For purposes of ad placement, a 24 hour day can be divided into any number of segments, however for the example of FIG. 5, five segments 506 have been chosen as an exemplary and non-limiting description of one aspect of the invention, these five daypart segments being: morning; daytime; early fringe; prime time; and overnight. Since for FIG. 5 a user has chosen to display the graphs in the center of the display according to impressions, for each of the five dayparts three bar graphs are shown where one of the three bar graphs indicates impressions 508 for demo targeting, one indicates impressions 510 for strategic targeting, and one indicates impressions 512 for demo+strategic targeting. At the bottom of FIG. 5 is a summary table where projected or actual results are shown according to dayparts 514 with respect to either impressions or CPM, and further with respect to targeting categories (demo, strategic, demo+strategic).

Figure 6:
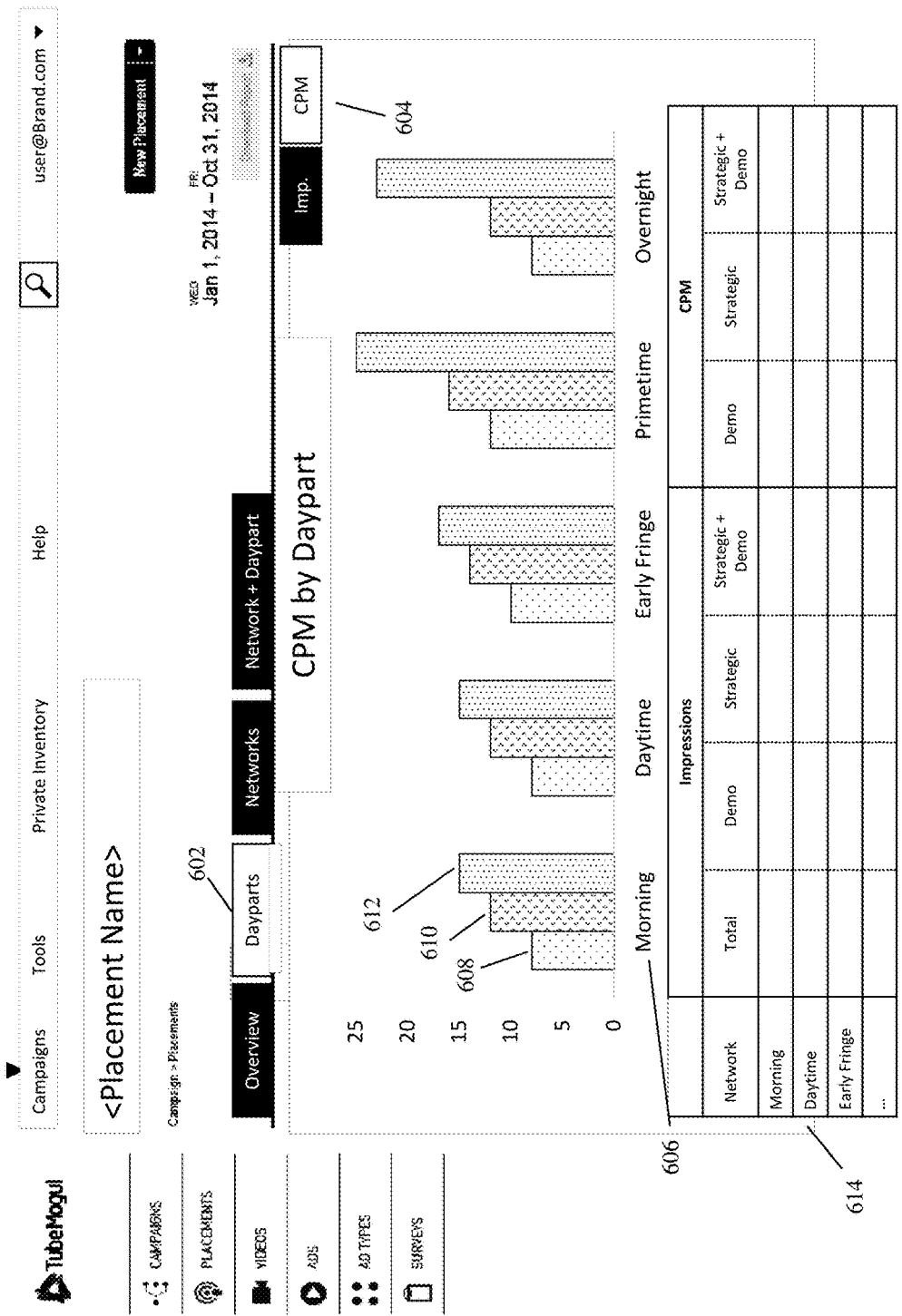
FIG. 6 describes a user interface and underlying processes according to the invention for displaying real or projected results for a TV advertising campaign with specific emphasis on projected or reported results displaying CPMs according to daypart.

FIG. 6 shows a "daypart" tab for an exemplary user interface for a planning tool according to the invention. Here, projected or actual results for CPMs are summarized by time of day and shown for basic demographic targeting (age and gender), strategic targeting, and a combination of basic demographic and strategic targeting. The user interface display of FIG. 6 shows the dayparts tab 602 selected and further, reporting according to CPM 604 is also selected which causes the graph in the center the display to represent CPM for each of the five daypart segments 606. Three bar graphs are shown for each daypart, each of the three bar graphs representing demo targeting 608, strategic targeting 610, and demo+strategic targeting 612. At the bottom of FIG. 6 is a summary table where projected or actual results are shown according to dayparts 614 with respect to either impressions or CPM, and further with respect to targeting categories (demo, strategic, demo+strategic).

Figure 7:
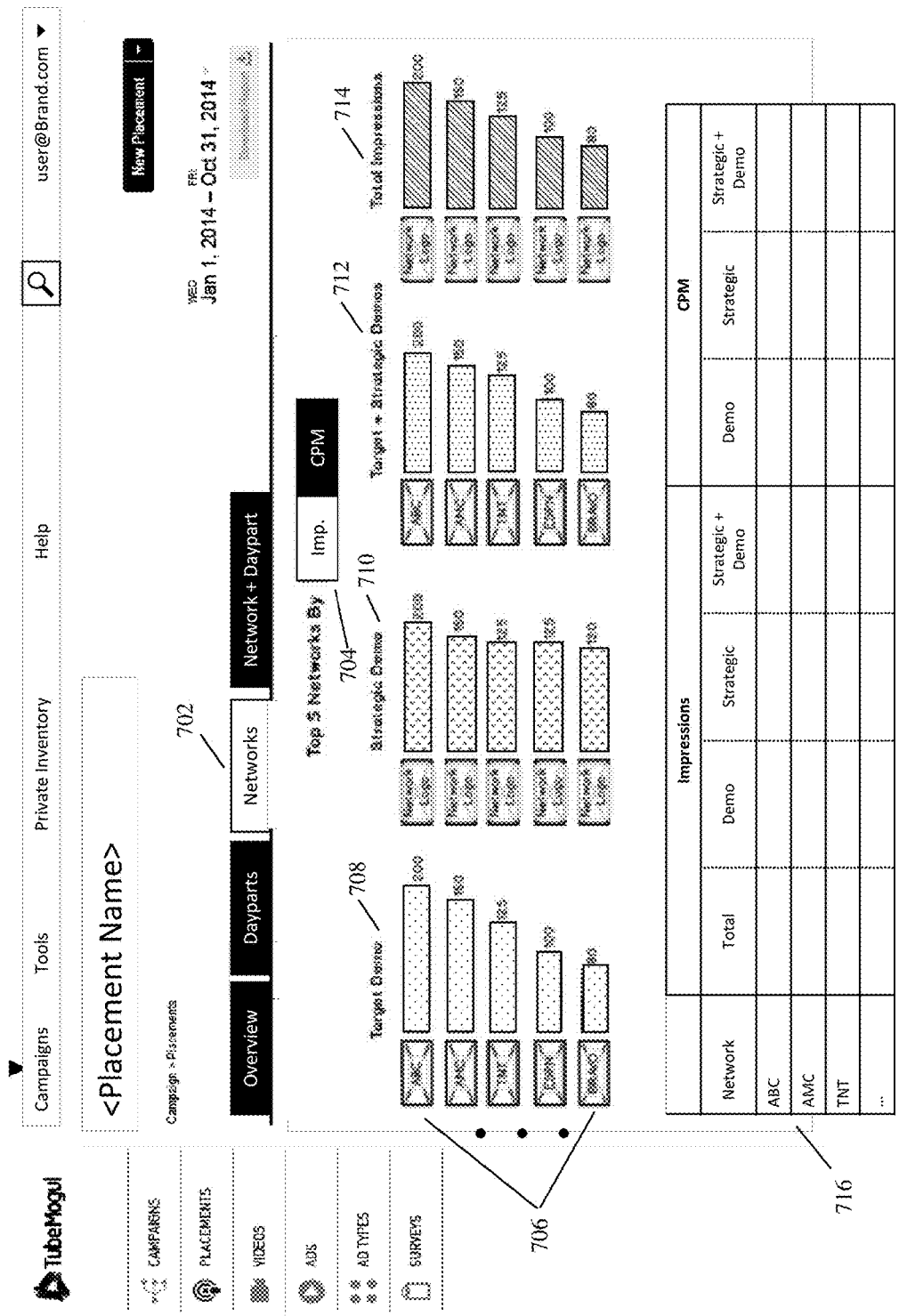
FIG. 7 describes a user interface and underlying processes according to the invention for displaying real or projected results for a TV advertising campaign where impressions or CPMs are displayed graphically with respect to networks.

FIG. 7 shows a "networks" tab 702 for an exemplary user interface for a tool according to the invention. Here, projected or actual results for CPMs or impressions are summarized by TV Network and shown for basic demographic targeting (age and gender), strategic targeting, and a combination of basic demographic and strategic targeting. Per FIG. 7, networks tab 702 has been selected and by selecting the box marked impressions 704 a user causes the horizontal bar graphs in the center of FIG. 7 to display projected or actual results in terms of impressions according to networks 706 and targeting category, the targeting categories being demo targeting 708, strategic targeting 710, demo+strategic targeting 712, and total campaign impressions 714. At the bottom of FIG. 7 is a summary table where projected or actual results are shown according to Networks 716 with respect to either impressions or CPM, and further with respect to targeting categories (demo, strategic, demo+ strategic, total for campaign). Note that the difference between demo+strategic targeting 712 and total campaign impressions 714 is that demo+strategic targeting 712 represents a union of the sets of impressions for demo and strategic targets, while total impressions 714 is simply the total number of impressions.

Note that networks to be targeted for a campaign can be input manually by a user/planner, or can be automatically chosen by the invention from a list of preferred networks. A tabular UI may also be provided that allows a user/planner to easily select preferred networks from a list of all networks.

Figure 8:
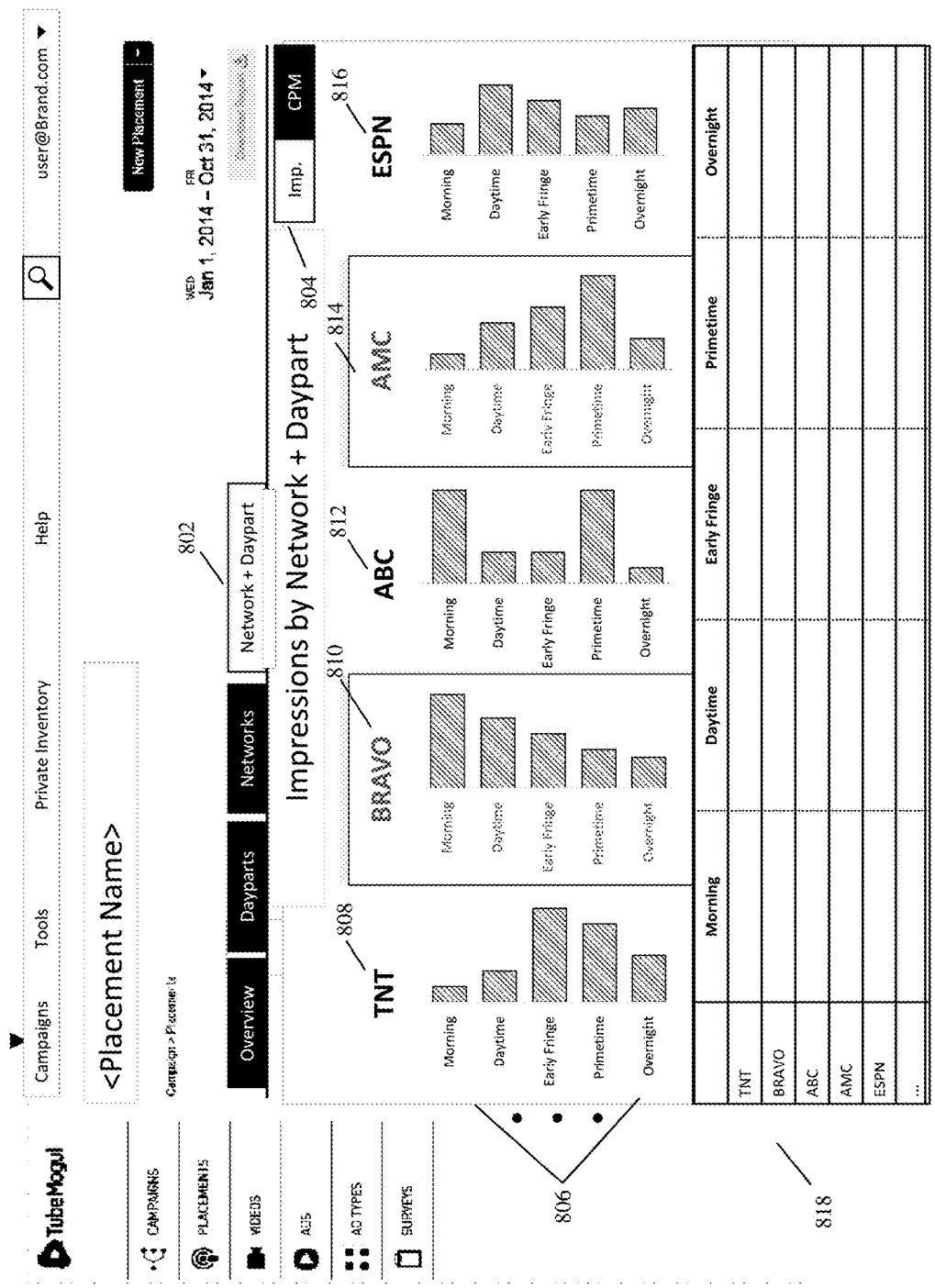
FIG. 8 describes a user interface and underlying processes according to the invention for displaying real or projected results for a TV advertising campaign where impressions or CPMs are displayed graphically with respect to networks and daypart.

FIG. 8 shows a "networks+daypart" tab 802 for an exemplary user interface for a tool according to the invention. Here, projected or actual results for impressions are summarized simultaneously by TV Network and daypart, and shown for basic demographic targeting (age and gender), strategic targeting, and a combination of basic demographic and strategic targeting. Per FIG. 8, Networks+ Dayparts tab 802 has been selected, and by selecting the box marked impressions 804 a user causes the horizontal bar graphs in the center of FIG. 8 to display projected or actual results in terms of impressions according to dayparts 806 and networks 808-816. The top five networks displayed for this non-limiting example are: TNT 808; Bravo 810; ABC 812; AMC 814; and ESPN 816. Note that any number of networks may be targeted and the number networks displayed using horizontal bar graphs such as those of FIG. 8 is limited only by available space on the display screen and/or the desires of either the user and/or user interface developer. Also, the choice of which networks to be displayed by such horizontal bar graphs may be determined by a number of mechanisms including: largest number of impressions or smallest number of impressions, or if a display based on CPM has been chosen: highest CPM or lowest CPM. At the bottom of FIG. 8 is a summary table where projected or actual results are shown according to Networks 818 with respect to impressions, and further with respect to daypart (morning, daytime, early fringe, prime-time, and overnight).

Figure 9:
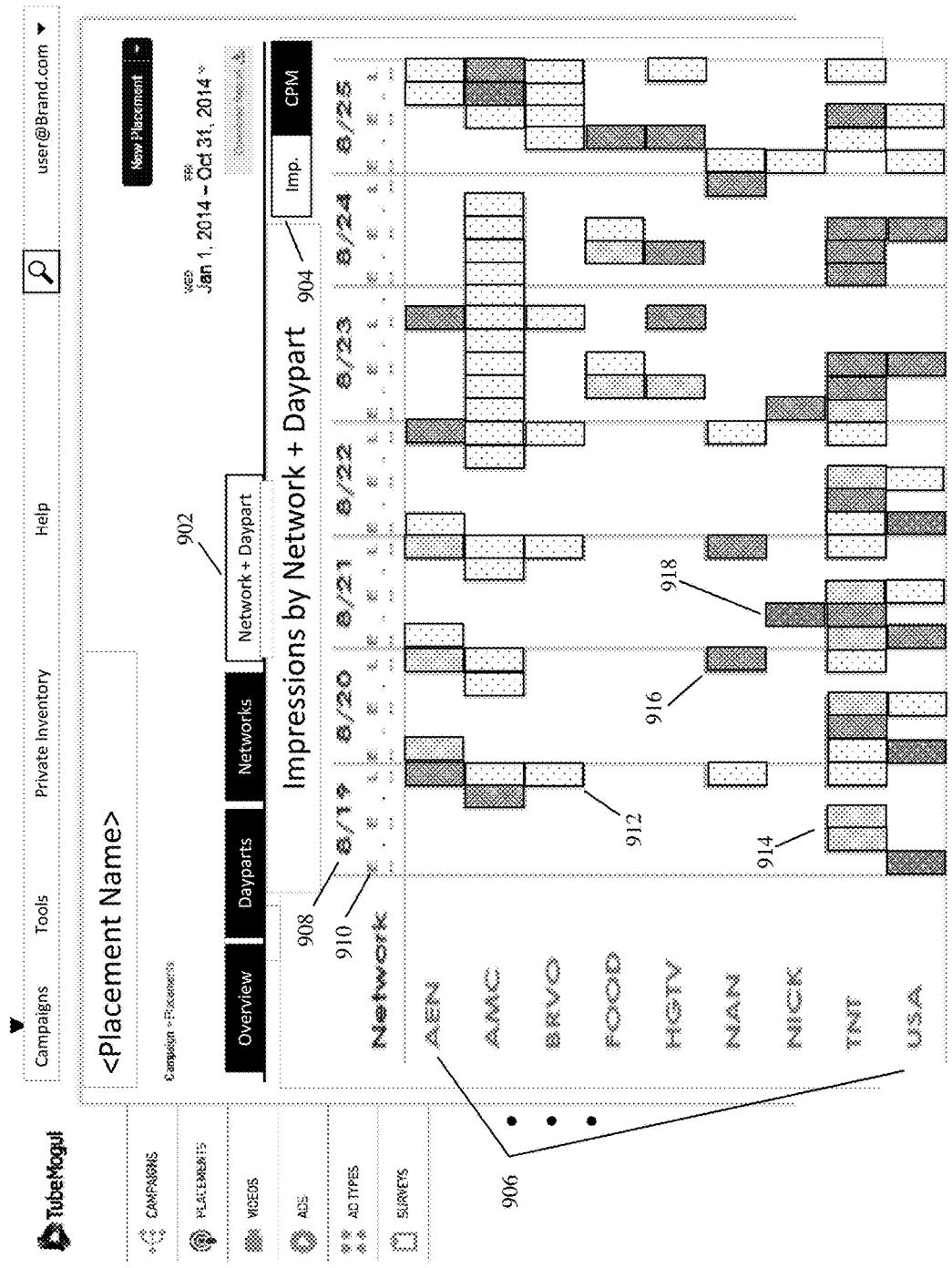
FIG. 9 describes a user interface and underlying processes according to the invention for displaying real or projected results for a TV advertising campaign where impressions or CPMs are displayed graphically with respect to networks and daypart, and where for each network and day of a campaign, an intensity bar is shown for each daypart.

FIG. 9 shows an alternative implementation for a "networks+daypart" tab for an exemplary user interface for a planning or reporting tool according to the invention. Here, projected or actual results for impressions are summarized simultaneously by TV Network and daypart. For the user-interface shown in FIG. 9, campaign results are shown broken down according to a specific date range, and daypart results are shown for each day within the date range. Specifically, for this alternate implementation, network+ daypart tab 902 is selected and control 904 is selected to enable impressions to be displayed for the graph in the center of the display. The graph is constructed horizontally with each row of the graph representing a specific TV network 906, and then divided vertically first by day 908 and within each day by daypart 910. For this example typically five dayparts are defined, consistent with those defined previously for FIGS. 5, 6, and 8. Within each row of the graph and in line with a particular network 906 are geometric shapes—in this case rectangles—with one rectangle displayable for each daypart position when impressions occur in the particular daypart. If no impressions occur for a given daypart no rectangle appears. Exemplary rectangles are shown in black/white shading patterns for FIG. 9, although for a UI on a computer display color shadings may be preferable. Four degrees of intensity are conveyed by the exemplary display of FIG. 9 starting with rectangle 912 indicating a relatively low number of impressions for a given daypart and network, rectangle 914 being colored more intensely, rectangle 916 being colored yet more intensely, and rectangle 918 conveying the most intense coloring and therefore indicating the highest level (comparatively) of impressions occurring in certain dayparts within the timeframe and network list covered by the graph of FIG. 9.

At times, a planner may wish to have raw data for the results of their campaign in order to help them assess campaign execution results. FIG. 10 shows such a raw data report. Data represented in any particular column of the table of FIG. 10 is exemplary and non-limiting. For example any particular relevant information in the table of FIG. 10 may include an ad ID 1002 identifying an advertisement; a date 1004 for which the results of the row are reported; a day of the week 1006; a time 1008 for the particular results; a daypart 1010 consistent with a previously defined daypart segmentation; a particular network 1012 for which the results are reported; Household (HH) impressions 1014 that occurred for the time reported; demo impressions 1016 for the time reported; strategic targeting impressions 1018 for the time reported; demo+strategic impressions 1020 for the time reported; and cost for impressions relating to those reported in the row of the table.

Figure 11:
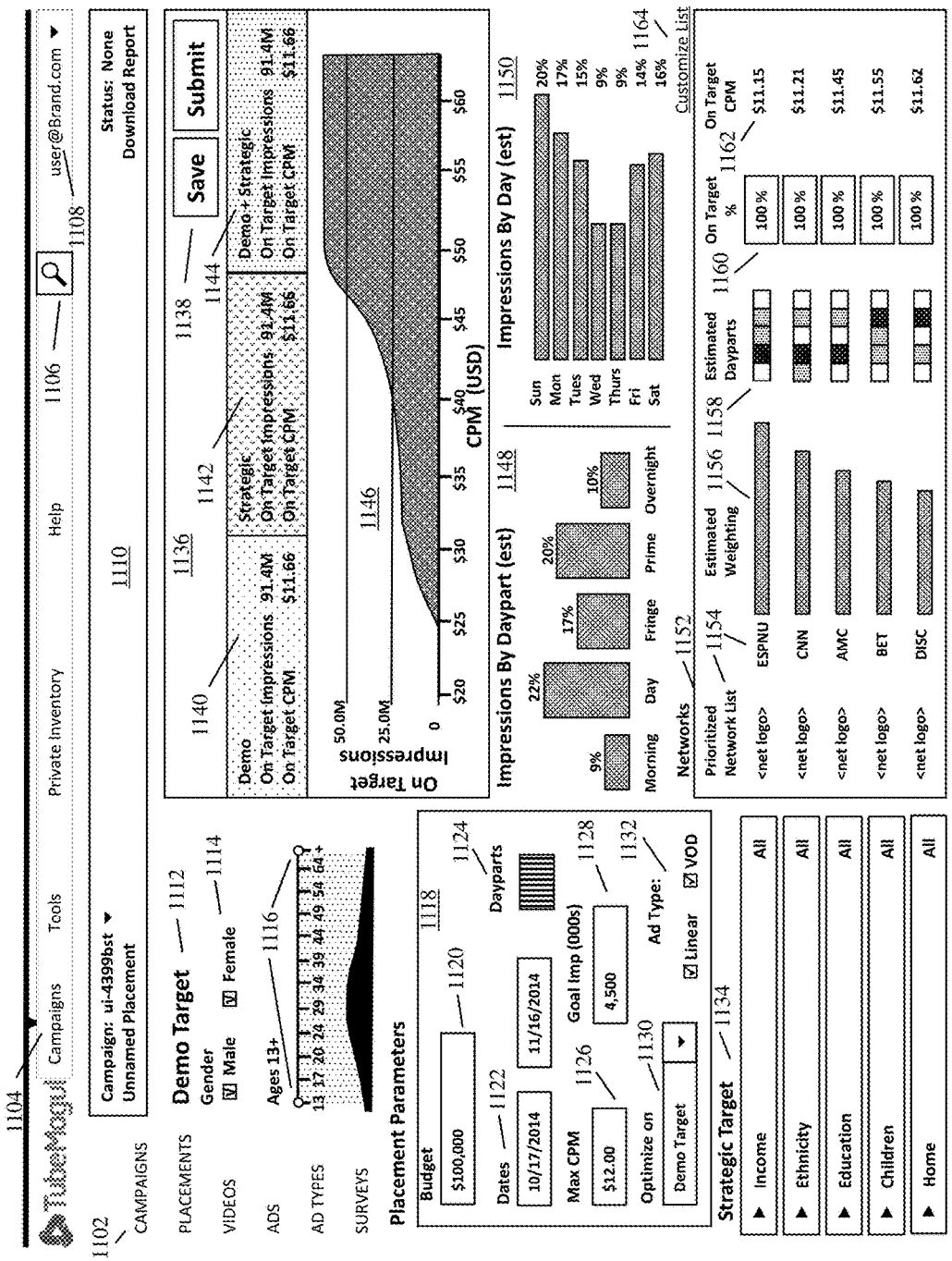
FIG. 11 describes a user interface and underlying processes according to the invention for displaying real or projected results for a TV advertising campaign for either planning or review purposes. Here, impressions and CPMs are displayed graphically with respect to networks and daypart, and intensity bar graphs are shown to indicate amounts of impressions with respect to both networks and daypart. Demographic and Strategic parameters for the campaign are also set in this user interface.

FIG. 11 shows an exemplary user interface for a planning and analysis tool for a strategic TV advertising campaign. Here, a planner can choose basic demographic targeting as well as strategic targeting categories. Upon entering placement parameters 1118 such as for example and without limitation: budget; scheduling; and cost goals, they may view automatically generated projections indicating parameters like on-target impressions, CPM, impressions by daypart, impressions by day, and a prioritized network list showing the effectiveness of networks that may be targeted. The user interface displayed in FIG. 11 is organized with control and targeting parameters on the left of the screen that a user/planner controls in order to construct or guide the planning of an ad campaign according to the invention. On the right side of the screen are estimated results that are updated as the control and targeting parameters are manipulated by the user/planner. At the top left of the screen are menu choices 1102 that provide a view according to campaigns; placement; videos; ads; ad type; and surveys. For a menu choice selected on the left side of the screen, further menu choices appear 1104 at the top of the screen, in this case for example: campaigns; tools; private inventory; and help. A search facility 1106 is available and an indication 1108 is also shown designating a particular user/planner under whose responsibility the particular ad campaign is being planned. Identifying documentation 1110 for the specific ad campaign is also shown.

At the left side of the screen where control and targeting parameters are input by a user/planner are demographic targeting information 1112, which focuses on gender and age targeting. Gender 1114 is targeted in this example with separate checkboxes for male and female. Age targeting is performed in FIG. 11 by an age range selection graphical function where a portion of a horizontally displayed age range is chosen for targeting by sliding either or both of range border objects 1116 to create a targeted age bracket between their positions. For the user interface of FIG. 11, objects 1116 are represented by circles and are positioned at the extreme of the age timeline thus bracketing between ages 13 and 64+. Above the age range selection graph is displayed text indicating "ages 13+", thus reminding the user that they may target an age bracket from 13 to 65+. Below the age range selection graph is a graph indicating the relative magnitude of impressions available at each age level—based on either historical or projected data—and given the gender choice 1114 made above.

Below the demographic targeting 1112 is a box 1118 wherein placement parameters are set by a user/planner. Here, a budget 1120 is input, and a date range 1122 for the campaign is set with separate boxes for start date and end date. A strategy for dayparts may be set by selecting icon 1124 marked Dayparts, whereupon the exemplary user interface of FIG. 12 appears. Next, a maximum cost per thousand impressions (CPM) can be entered in the box labeled "Max CPM" 1126, and "Goal Impressions (000s)" 1128 may be entered for the campaign placement. Box 1130 indicates a choice of optimization for targeting, where in this example "Demo Target" has been chosen. Other selections possible through the drop-down menu include "Strategic Target" and "Demo+Strategic Target". Additionally a user/planner may select from one or more ad types 1132, where in this example and without limitation they are presented with choices for "Linear" and "VOD", both of which have been checked. At the bottom left of the user-interface display of FIG. 11 are facilities for choosing strategic targeting 1134 wherein a user/planner may target different parameters within one or more of the following exemplary and non-limiting parameter categories:

Income; Ethnicity; Education; Children; and Home. Parameters for each of these may include without limitation and for example:

Income—income of targeted person or household income related to targeted person.

Ethnicity—ethnicity of targeted person, or ethnicity of related persons within household of the targeted person.

Education—education level completed, including any of: grade school; high school; junior college; trade school; graduate school.

Children—number of children in household, gender of children, age of children.

Home—value range of home owned by targeted person's household, range of rental paid by targeted person's household.

Buying habits—categories of products and services typically purchased by a targeted person.

Strategic targeting may also include buying habits of targeted viewers.

On the right-hand side of the exemplary user interface of FIG. 11 is results display 1136. When a planner makes adjustments to demographic targeting 1112, placement parameters 1118, or strategic targeting 1134, results display 1136 is automatically updated. Display 1136 includes buttons for save and submit 1138 thereby allowing a planner to save projected results or submit a specific campaign plan whereupon the order is executed with designated supply partners. For a specific combination of targeting and placement parameters, projected or actual results are shown in 1136 for on-target impressions and CPM with respect to demographic targeting 1140, strategic targeting 1142, and demo+strategic targeting 1144. A graph 1146 showing on-target impressions with respect to CPM is displayed. Vertical bar graph 1148 shows impressions by daypart, while horizontal bar graph 1150 shows impressions by day. A box showing results with respect to networks 1152 is shown with a prioritized network list 1154 where for each network in the list, a horizontal bar graph 1156 indicates a relative weighting for impressions compared with other targeted networks. For each network an estimated weighting of impressions by daypart is shown by a segmented horizontal graph 1158. Each of the segments is shaded or colored with an intensity that provides an indication of relative weighting of impressions with respect to daypart. An on-target percentage 1160 is shown for each network, as well as an on-target CPM 1162. The list of networks can be customized by selecting the link called "Customize List" 1164.

FIG. 12 shows an exemplary user interface that is typically shown as a result of clicking the Dayparts icon 1124 in FIG. 11 and enables a user/planner to select which days and dayparts they desire their campaign to run. While other formats may be used to enter combinations of daypart and day to be used for a campaign, table 1202 of FIG. 12 can accelerate and ease the process by allowing a user/planner to select all days for a given daypart—by clicking a title 1204 at the top for a given daypart—or select all dayparts for a given day by clicking a title 1206 at the left for a given day. Specific day/daypart combinations may also be individually selected or de-selected by clicking an individual box 1208 in the table where the selection will toggle in response. Note that as shown in FIG. 12 the number of dayparts representing a day and the timeframes for each daypart are arbitrary and exemplary, and other choices for daypart definitions are possible according to the invention. Further, a table input facility like that of FIG. 12 can be provided separately for each network, thereby allowing a planner to control a campaign directly in a manner consistent with the exemplary results shown in FIG. 9.

Figure 13:
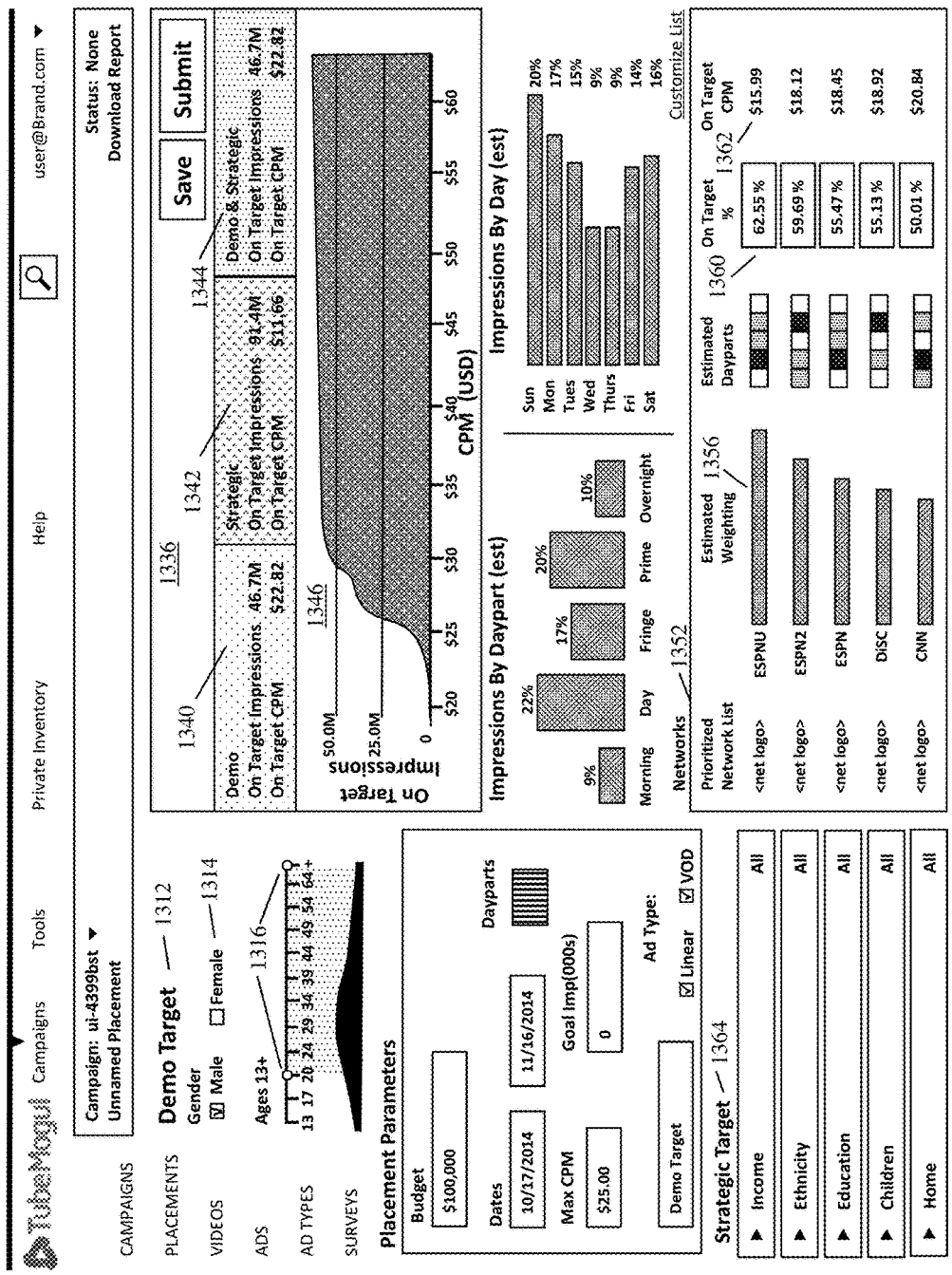
FIG. 13 describes a user interface and underlying processes according to the invention for displaying real or projected results for a TV advertising campaign for either planning or review purposes. Here, impressions and CPMs are displayed graphically with respect to networks and daypart, and intensity bar graphs are shown to indicate amounts of impressions with respect to both networks and daypart. Demographic and Strategic parameters for the campaign are also set in this user interface.

FIG. 13 shows an exemplary user interface for a planning tool for a strategic TV advertising campaign where the functionality is similar to that shown in FIG. 11, however for this scenario of FIG. 13 the planner has chosen different age and gender targeting and thus the automatically projected results shown (On-Target Impressions per time) are noticeably different from those of FIG. 11. Note that for FIG. 13 demo targeting controls 1312 have been set so that for gender 1314, male is checked and female is not. Also age bracketing has been revised by sliding one of the range border objects 1316 such that ages from 20 to 64+ are now targeted. Even without changing strategic targeting parameters 1364, results 1346 representing on-target impressions at different CPM levels are changed from those of FIG. 11. Also result summary 1336 has changed with respect to demographic targeting 1340 and combined targeting 1344, but not strategic targeting 1342. Notice at the bottom of the projected or actual results, that relative to networks reporting 1352 the estimated weighting (or actual weighting) 1356 has changed, and with more emphasis on sports given the focus on male gender and also as a result of removing teenagers from the targeted age bracket. The three ESPN networks are now most heavily weighted 1356, and on-target percentage 1360 and on-target CPM 1362 are also changed.

Figure 14:
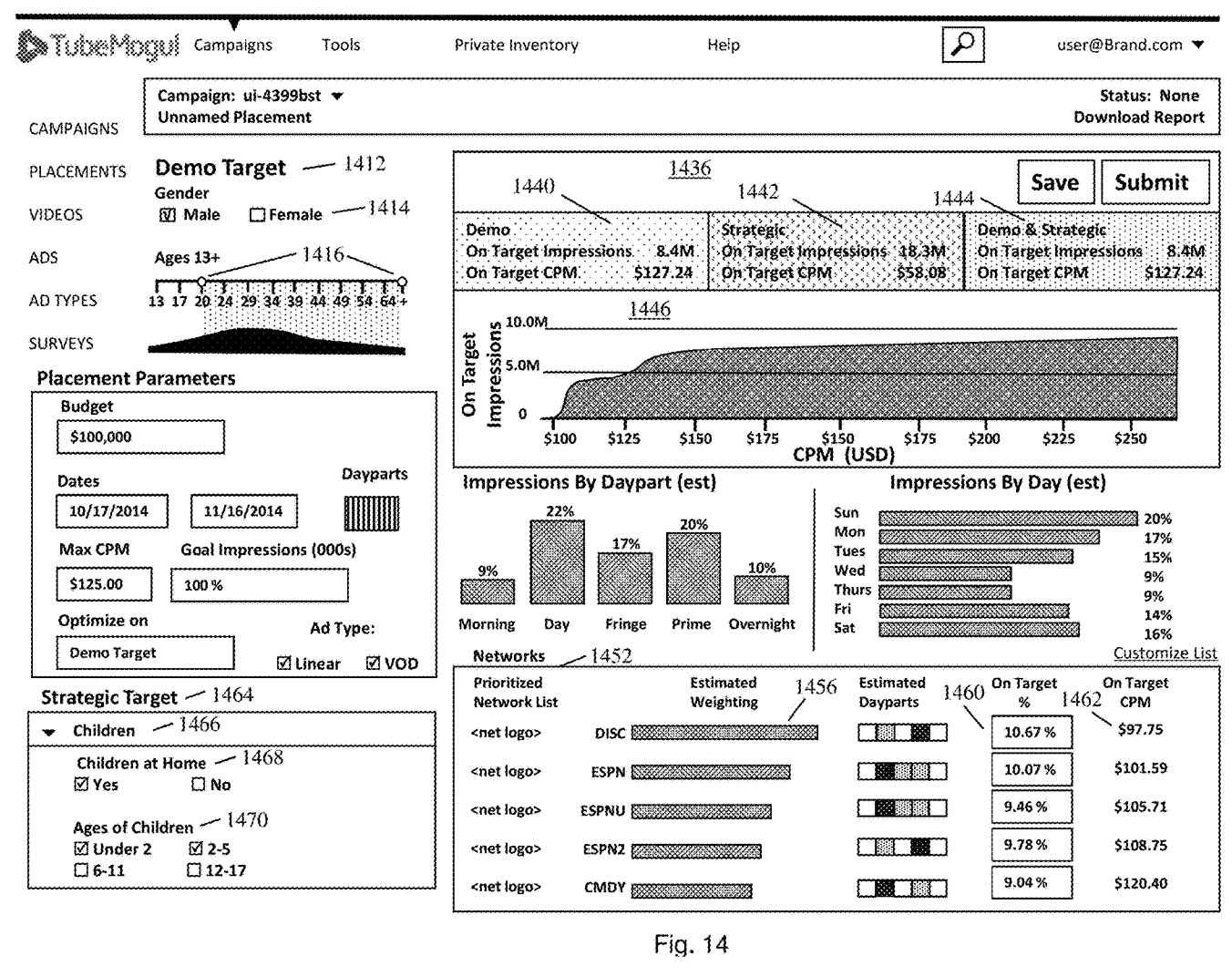

FIG. 14 shows an exemplary user interface for a planning tool for a strategic TV advertising campaign where the functionality is similar to that shown in FIG. 13, however for this scenario shown in FIG. 14 the planner has chosen different strategic targeting—in particular they have chosen to target men with children having ages falling into specific age brackets. Thus, the automatically projected results shown are noticeably different from those of FIG. 13. The exemplary user interface of FIG. 14 shows demographic targeting 1412 similar to that of FIG. 13 including gender 1414 and age bracketing range border objects 1416. However for FIG. 14, a strategic targeting element 1464 has been added where the parameters for children 1466 are included. Here, households with children at home 1468 are targeted, and in particular ages of children 1470 are included for both under 2 years and 2-5 years old. As a result of this enhanced strategic targeting, estimated (or actual) results 1446 are changed with respect to on-target impressions resulting from different levels of CPM expenditure. Results summary 1436 shows significant changes with respect to demographic targeting results 1440, strategic targeting results 1442 and combined targeting results 1444. In addition, the distribution of ad placements with respect to networks 1452 has changed again, with more weighting on Discovery Channel than the various sports networks, and accordingly on-target percentages 1460 and on-target CPM 1462 have both changed again with respect to the scenarios of FIGS. 11 and 13.

Figure 15:
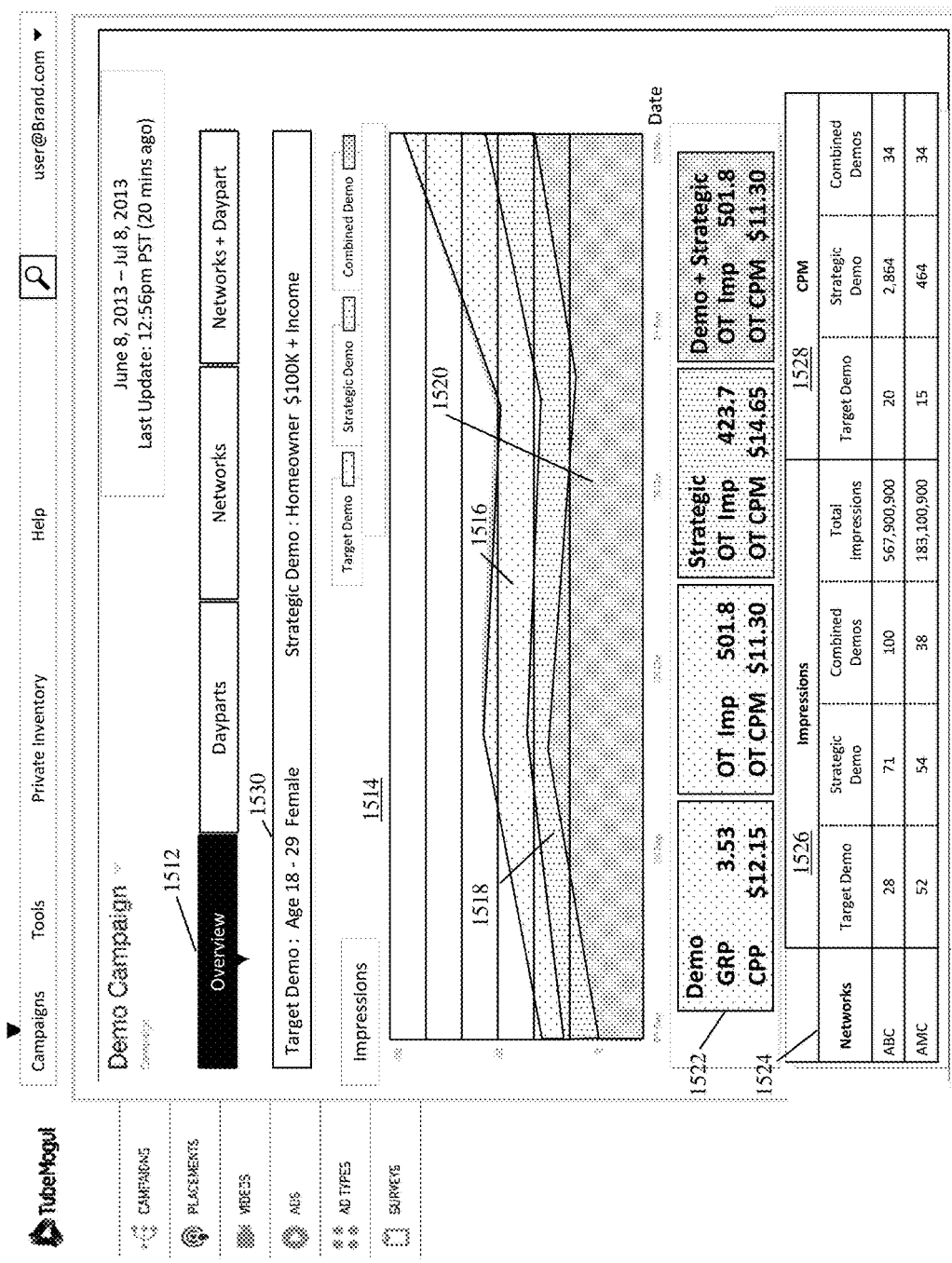
FIG. 15 describes a user interface and underlying processes according to the invention for displaying real or projected results for a TV advertising campaign including demographic, strategic, and combined targeting, all shown with respect to networks and/or daypart.

FIG. 15 shows an "Overview" tab for an exemplary user interface for a planning tool according to the invention. Here, projected results for on-target impressions are shown graphed over the run time for the campaign. Also, results for basic demographic targeting, strategic targeting, and combined targeting are summarized in terms of on-target impressions and CPM. Similar results according to TV network are also shown. FIG. 15 depicts an overview 1512 display for a campaign where projected or actual results are graphed 1514 in a manner similar to the graph shown in FIG. 4. However, FIG. 15 also includes a display 1530 that describes the specific demographic targeting shown for the campaign—in this case age 18 to 29 and female—as well as specific strategic targeting which includes female targets who are homeowners and have an income of $100,000+. Graph 1514 includes impressions per time shown separately for demographic targeting 1516, strategic targeting 1518, and combined targeting 1520. The results table 1522 for totals over this the campaign run time are shown. Also shown at the bottom of the user interface display of FIG. 15 is a summary table 1524 where impressions 1526 and CPMs 1528 are shown according to different networks—in this case ABC and AMC. When the user interface display of FIG. 15 indicates projected results for a future campaign, any change to targeting characteristics, demographic or strategic or both, will affect the results displayed as shown.

Figure 16:
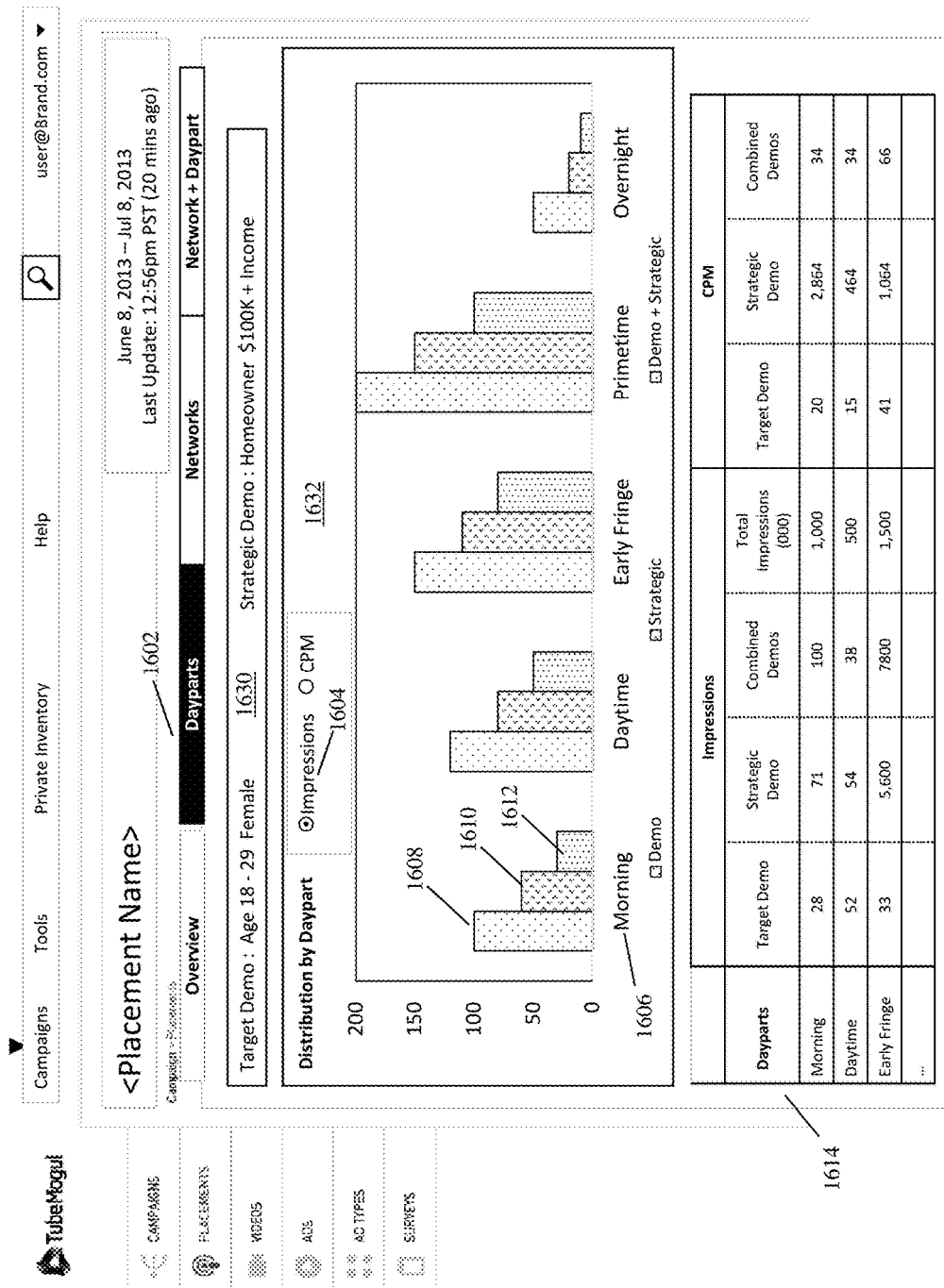
FIG. 16 describes a user interface and underlying processes according to the invention for displaying real or projected results for a TV advertising campaign including bar graphs for demographic, strategic, and combined targeting, all shown with respect to daypart. Results with respect to impressions ad CPMs are also shown with respect to daypart.

FIG. 16 shows a "Daypart" tab 1602 for an exemplary user interface for a tool according to the invention for the campaign per FIG. 15. Here, projected or actual results for on-target impressions 1604 or CPM are shown graphed according to time of day grouping. Results for basic demographic targeting, strategic targeting, and combined targeting are summarized in the time of day graph, and also summarized in terms of on-target impressions and CPMs for key dayparts of interest. In the exemplary user interface display of FIG. 16, a graph 1632 has been configured to represent impressions 1604. For each daypart segment 1606, bar graphs are shown for each targeting category including demographic targeting 1608, strategic targeting 1610, and combined targeting 1612. A result summary table 1614 is shown at the bottom of the display where impressions and CPM are shown for each daypart segment. Above graph 1632 is a display 1630 that summarizes the specific demographic targeting for the campaign—in this case age 18 to 29 and female—as well as specific strategic targeting which includes female targets who are homeowners and have an income of $100,000+.

Figure 17:
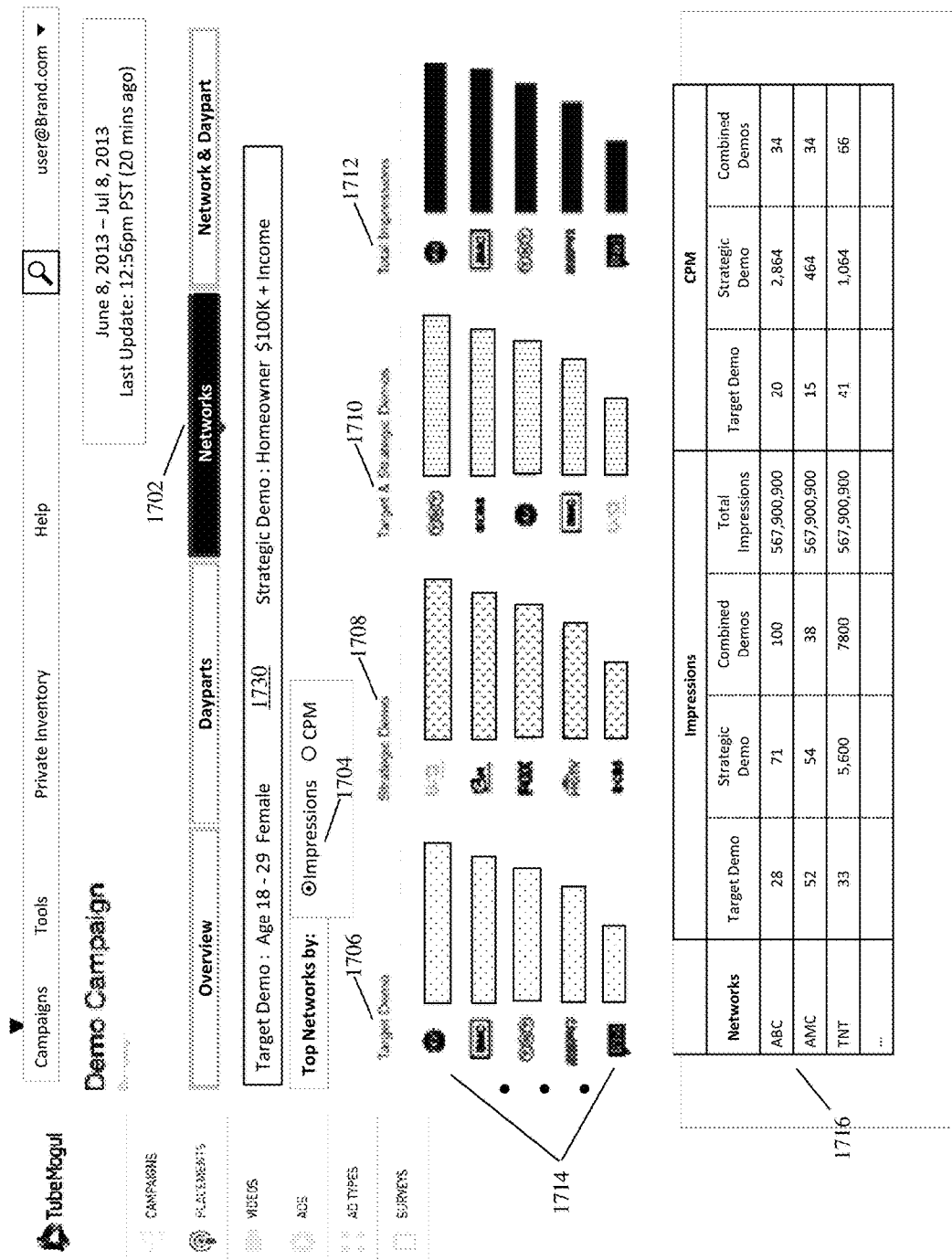
FIG. 17 describes a user interface and underlying processes according to the invention for displaying real or projected results for a TV advertising campaign including bar graphs for demographic, strategic, and combined targeting, all shown with respect to network. Results with respect to impressions ad CPMs are also shown with respect to network.

FIG. 17 shows a "Networks" tab 1702 for an exemplary user interface for a tool according to the invention for the campaign of FIGS. 15 and 16. Here, projected results for on-target impressions or CPM are shown graphed according to TV network 7014, with impressions 1704 selected for this particular display. Results for basic demographic targeting 1706, strategic targeting 1708, and combined targeting 1710 are also summarized and prioritized in terms of TV Network 1714 along with total impressions 1712 for each network. Impressions for each of targeting parameters 1706, 1708, 1710, and 1712 are represented in FIG. 17 in terms of horizontal bar graphs which have been sorted such that TV networks having the largest numbers of impressions are shown at the top. At the bottom of FIG. 17 is a summary table where both impressions and CPMs are summarized according to network.

Figure 18:
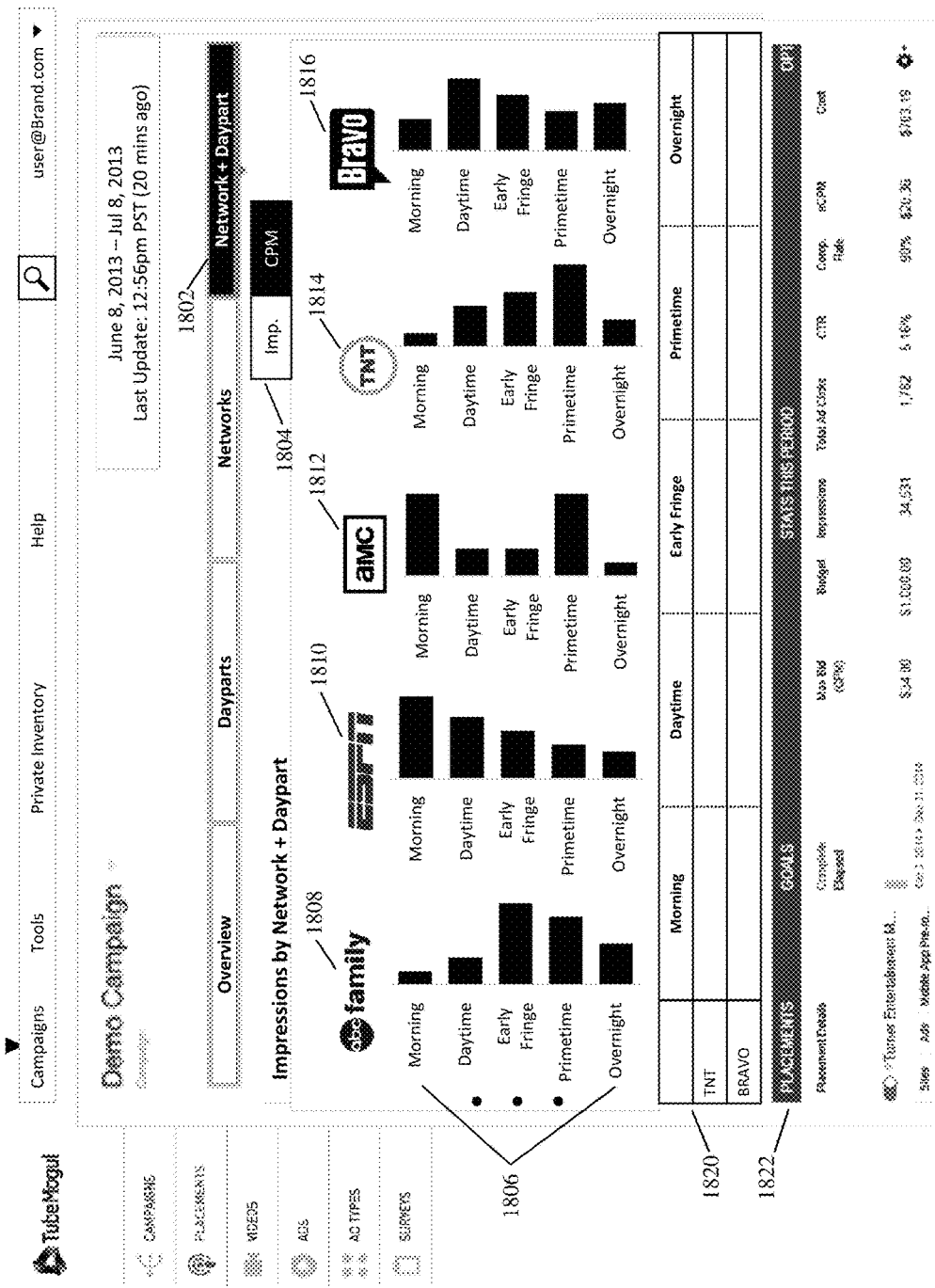
FIG. 18 describes a user interface and underlying processes according to the invention for displaying real or projected results for a TV advertising campaign including bar graphs for either impressions or CPMs shown with respect to daypart for each of a list of networks. Summary results by daypart for each network are also shown along with statistics for placements over a specified time period.

FIG. 18 shows a "Networks+Daypart" tab 1802 for an exemplary user interface for a tool according to the invention for the campaign per FIGS. 15-17. Here, impressions 1804 have been selected and projected or actual results for on-target impressions by daypart 1806 are shown graphed according to TV network. A horizontal bar graph is displayed for each TV network, with the exemplary display of FIG. 18 including five example networks: ABC family 1808; ESPN 1810; AMC 1812; TNT 1814; and Bravo 1816. As indicated in previous figures five dayparts are typically depicted, however definitions for dayparts are arbitrary and other divisions of the day are possible within the scope of the invention. A table 1820 is included summarizing impressions or CPM according to daypart for each targeted TV network. Also at the bottom of the display of FIG. 18 a statistical summary 1822 is that includes for each placement: a completion status; and maximum bid; a total budget; a total of impressions; a total number of ad clicks; a CTR (click through rate) percentage; a completion rate percentage; and an eCPM (effective CPM or On-Target CPM) value; and a total cost.

FIG. 19 shows an exemplary and non-limiting list of other "strategic" targeting viewership data available from $3^{rd}$ Party Sources. This particular example represents data available from Nielsen. However, similar as well as different strategic targeting viewership data is available from a variety of $3^{rd}$ party sources other than Nielsen. As shown on FIG. 19, Purchase/Usage data 1902 may consist for example of:

Nielsen PRIZM Code;
Nielsen P$YCLE Z6 Code;
Nielsen ConneXions Z6 Code;
Principal Shopper;
Frequent Moviegoer Code;
Avid Moviegoer Code
Principal Moviegoer Code;
Pay Channels;
Beverage Usage Bottled Water;
Beverage Usage Coffee or Tea;
Beverage Usage Soft Drinks; and
Beverage Usage Table Wine.
And, Ownership Data 1904 may consist for example of:
DVD Owner;
Presence of DVR;
Number of TV Sets;
Number of TV Sets with Pay;
Video Game Owner;
Number of VCRs;
Number of Cars;
Number of Trucks;
New Car Prospect Last 3 Years;
New Car Prospect Last 5 Years;
New Truck Prospect Last 3 Years;

New Truck Prospect Last 5 Years;
College Student Away;
HD Capable Home;
Number of Operable Computers Code;
Number of Operable Tablets Code; and
Cell Phone used to Access.

Note that the quantity and complexity of the data and tasks involved in the invention make implementation of the invention impossible without the aid of a machine, typically the one or more processors referred to above. During the analysis processes involved, millions of data elements must be considered and without using a machine as part of the invention, its implementation would not be possible. The claims reflect a computerized process since, at this time, computing resources have evolved to include "Cloud-based" computing as described above in the Background section. As such, it is also impossible to predict where (physically) the claimed processes will be executed and/or if they will be distributed across multiple machines. It is also impossible to predict the specific ownership of machines whereupon the claimed processes will be executed, and therefore against whom the claims would protect against should the claims instead have been written as system claims as opposed to the method claims attached hereto.

What is claimed is:

1. A computerized method for planning advertising campaigns for television, comprising:
   receiving information related to a first television ad slot and a second television ad slot;
   receiving viewership data associated with the first television ad slot and the second television ad slot;
   receiving, from an advertiser, targeting characteristics and placement parameters for an advertising campaign;
   analyzing, by one or more processors, the viewership data to determine a first set of viewer characteristics for viewers who watch the first television ad slot, the first set of viewer characteristics comprising one or more of strategic viewer characteristics or demographic viewer characteristics;
   assigning a first score to the first television ad slot based on a cost of projected on-target impressions for the first television ad slot where, for each projected on-target impression, the first set of viewer characteristics match the targeting characteristics received from the advertiser;
   analyzing, by the one or more processors, the viewership data to determine a second set of viewer characteristics for viewers who watch the second television ad slot, the second set of viewer characteristics comprising one or more of strategic viewer characteristics or demographic viewer characteristics;
   assigning a second score to the second television ad slot based on a cost of projected on-target impressions for the second television ad slot, where for each projected on-target impression, the second set of viewer characteristics match the targeting characteristics received from the advertiser;
   projecting, based on the first and second scores, results for the advertising campaign for the first television ad slot and the second television ad slot on each television network of a plurality of television networks;
   automatically determining weights for the projected results for the first television ad slot and the second television ad slot on each television network that indicates impressions compared with other television networks of the plurality of television networks;
   providing, for display by way of a single user interface, a presentation of the weights for the projected results for the first television ad slot and the second television ad slot associated with each television network that indicates impressions compared with other television networks of the plurality of television networks;
   generating, using the weighted projected results, a prioritized list of suggested ad slots according to the television networks; and
   providing, for display by way of the single user interface, the prioritized list of suggested ad slots according to the television networks for the advertising campaign to the advertiser.

2. The computerized method of claim 1, wherein projecting the results comprises projecting a number of projected on-target impressions for each of the first television ad slot and the second ad television slot on each of the television networks.

3. The computerized method of claim 1, wherein projecting the results comprises projecting a cost per on-target impression for each of the first television ad slot and the second television ad slot on each of the television networks.

4. The computerized method of claim 1, wherein the strategic viewer characteristics comprise, for each viewer, one or more of a buying behavior, an income, an ethnicity, an education level, a number of children, a home, an auto, or a pet.

5. The computerized method of claim 1, wherein the first and second scores are further based on a cost of projected on-target impressions associated with each television network.

6. The computerized method of claim 1, wherein the viewership data associated with the first television ad slot comprises historical viewing information indicating viewers who historically watch television during the first television ad slot, and the viewership data associated with the second television ad slot comprises historical viewing information indicating viewers who historically watch television during the second television ad slot.

7. The computerized method of claim 1, wherein the viewership data associated with the first television ad slot comprises projected future viewing information indicating viewers who are projected to watch the television networks during the first television ad slot, and the viewership data associated with the second television ad slot comprises projected future viewing information indicating viewers who are projected to watch the television networks during the second television ad slot.

8. The computerized method of claim 1, wherein the demographic viewer characteristics comprise one or more of an age or a gender.

9. The computerized method of claim 1, further comprising determining a distribution of ad placements for the advertising campaign based on the placement parameters, wherein the placement parameters comprise a spending limit established for each television ad slot in the prioritized list of suggested ad slots.

10. A computerized method for reviewing and reporting on actual results for advertising campaigns for television, comprising:
   receiving viewership data for an advertising campaign, the viewership data comprising viewer characteristics indicating attributes of viewers who have watched content of the advertising campaign during one or more ad slots;
   receiving placement data for the advertising campaign, the placement data comprising one or more of a network where an impression occurred, a number of impressions, a time of day when an impression occurred, or a cost of an impression;
comparing the received viewership data with targeting characteristics used to organize the advertising campaign;
providing, for display by way of a single user interface, one or more options for setting placement parameters to compare with the received placement data to organize the advertising campaign;
comparing, based on receiving placement parameters by way of the single user interface, the received placement data with the received placement parameters used to organize the advertising campaign;
generating, based on the comparison of the received viewership data with the targeting characteristics and the comparison of the received placement data with the placement parameters, results for the advertising campaign, wherein the results comprise on-target impressions corresponding to one or more of demographic viewer characteristics or strategic viewer characteristics; and
providing, for display by way of the single user interface, a presentation of the results for the advertising campaign together with a presentation of the received placement data and the one or more options for setting placement parameters.

11. The computerized method of claim 10, wherein the generated results further comprise one or more of impressions corresponding to television networks or impressions corresponding to dayparts.

12. The computerized method of claim 10, wherein the generated results further comprise one or more of a cost with respect to television networks, a cost corresponding to dayparts, or a cost corresponding to time.

13. The computerized method of claim 10, wherein the strategic viewer characteristics comprise, for each viewer, one or more of a buying behavior, an income, an ethnicity, an education level, a number of children, a home, an auto, or a pet.

14. The computerized method of claim 10, further comprising reporting the results in terms of one or more of a number of on-target impressions or a cost per on-target impression.

15. The computerized method of claim 10, further comprising reporting the results in terms of one or more of Gross Rating Points or Cost per Gross Rating Point.

16. The computerized method of claim 10, wherein an on-target impression comprises an impression where the targeting characteristics match the viewership data.

17. The computerized method of claim 16, further comprising determining a television network where an on-target impression appeared and a daypart indicating when the on-target impression appeared.

18. The computerized method of claim 17, further comprising reporting a number of on-target impressions for the advertising campaign, wherein the reporting comprises indicating one or more of networks where the on-target impressions appeared and dayparts for each network indicating when the on-target impressions appeared.

19. The computerized method of claim 18, wherein the reporting further comprises indicating demographic viewer characteristics and strategic viewer characteristics corresponding to each daypart when the on-target impressions appeared.

20. The computerized method of claim 18, wherein the reporting further comprises indicating a cost per on-target impression.

21. The computerized method of claim 20, wherein the demographic viewer characteristics comprise one or more of age and gender.

22. A system for planning advertising campaigns for television, comprising instructions that, when executed by one or more processors, cause the system to:
receive information related to a first television ad slot and a second television ad slot;
receive viewership data associated with the first television ad slot and the second television ad slot;
receive, from an advertiser, targeting characteristics and placement parameters for an advertising campaign;
analyze the viewership data to determine a first set of viewer characteristics for viewers who watch the first television ad slot, the first set of viewer characteristics comprising one or more of strategic viewer characteristics or demographic viewer characteristics;
assign a first score to the first television ad slot based on a cost of projected on-target impressions for the first television ad slot where, for each projected on-target impression, the first set of viewer characteristics match the targeting characteristics received from the advertiser;
analyze the viewership data to determine a second set of viewer characteristics for viewers who watch the second television ad slot, the second set of viewer characteristics comprising one or more of strategic viewer characteristics or demographic viewer characteristics;
assign a second score to the second television ad slot based on a cost of projected on-target impressions for the second television ad slot, where for each projected on-target impression, the second set of viewer characteristics match the targeting characteristics received from the advertiser;
project, based on the first and second scores, results for the advertising campaign for the first television ad slot and the second television ad slot on each television network of a plurality of television networks;
automatically determine weights for the projected results for the first television ad slot and the second television ad slot on each television network that indicates impressions compared with other television networks of the plurality of television networks;
provide, for display by way of a single user interface, a presentation of the weights for the projected results for the first television ad slot and the second television ad slot associated with each television network that indicates impressions compared with other television networks of the plurality of television networks;
generate, using the weighted projected results, a prioritized list of suggested ad slots according to the television networks; and
provide, for display by way of the single user interface, the prioritized list of suggested ad slots according to the television networks for the advertising campaign to the advertiser.

23. The system of claim 22, wherein the projected results comprise projected on-target impressions for each of the first television ad slot and the second ad slot on each of the television networks.

24. The system of claim 22, wherein the projected results comprise a cost per on-target impression for each of the first television ad slot and the second ad slot on each of the television networks.

25. The system of claim 22, wherein the strategic viewer characteristics comprise one or more of a buying behavior, an income, an ethnicity, an education level, a number of children, a home, an auto, or a pet.

26. The system of claim 22, wherein the first and second scores are further based on a cost of projected on-target impressions associated with each television network.

27. The system of claim 22, further comprising instructions, that when executed by the one or more processors, cause the system to determine a distribution of ad placements for the advertising campaign based on the placement parameters, wherein the placement parameters comprise spending limits for each ad slot in the prioritized list of suggested ad slots.

* * * * *